US010025174B1

(12) United States Patent
Tait et al.

(10) Patent No.: US 10,025,174 B1
(45) Date of Patent: Jul. 17, 2018

(54) MULTI-THEATER LIGHT SOURCE

(71) Applicant: DISNEY ENTERPRISES, INC., Burbank, CA (US)

(72) Inventors: Thomas Tracey Tait, Santa Clarita, CA (US); Quinn Y. Smithwick, Pasadena, CA (US); Steven T. Kosakura, Tustin, CA (US); Mark A. Reichow, Valencia, CA (US); Scott Frazier Watson, Marina Del Ray, CA (US)

(73) Assignee: Disney Enterprises, Inc., Burbank, CA (US)

(*) Notice: Subject to any disclaimer, the term of this patent is extended or adjusted under 35 U.S.C. 154(b) by 0 days.

(21) Appl. No.: 15/618,266

(22) Filed: Jun. 9, 2017

Related U.S. Application Data

(60) Provisional application No. 62/468,296, filed on Mar. 7, 2017.

(51) Int. Cl.
| G03B 21/20 | (2006.01) |
| H04N 9/31 | (2006.01) |
| G03B 35/20 | (2006.01) |
| H04N 13/04 | (2006.01) |
| H04N 13/337 | (2018.01) |
| H04N 13/363 | (2018.01) |
| H04N 13/398 | (2018.01) |

(52) U.S. Cl.
CPC ......... *G03B 35/20* (2013.01); *G03B 21/2013* (2013.01); *G03B 21/2033* (2013.01); *G03B 21/2046* (2013.01); *G03B 21/2093* (2013.01); *H04N 9/3155* (2013.01); *H04N 9/3161* (2013.01); *H04N 13/0434* (2013.01); *H04N 13/0459* (2013.01); *H04N 13/0497* (2013.01); *H04N 13/337* (2018.05); *H04N 13/363* (2018.05); *H04N 13/398* (2018.05); *H04N 9/3147* (2013.01)

(58) Field of Classification Search
CPC .. H04N 9/3147; H04N 9/3161; H04N 9/3164; H04N 13/354; H04N 13/341; G03B 21/2033; G03B 21/2013; G03B 21/206; G03B 35/16
USPC ........................................................ 353/94
See application file for complete search history.

(56) References Cited

U.S. PATENT DOCUMENTS

| 2015/0138510 A1* | 5/2015 | Domm ............... G02B 27/1026 353/31 |
| 2016/0227199 A1* | 8/2016 | Gocke ................ H04N 13/0497 |

* cited by examiner

*Primary Examiner* — Ryan Howard
(74) *Attorney, Agent, or Firm* — Marsh Fischmann & Breyfogle LLP; Kent A. Lembke

(57) ABSTRACT

A multi-theater light source for two or more 3D projectors positioned in differing spaces. The apparatus includes a first light source outputting light to display left eye content, and the apparatus includes a second light source outputting light for use by the projectors to display right eye content. The apparatus includes a switching device that receives the light output from the first and second light sources and switches between first and second operating states to route the left and right eye light. In the first operating state, the switching device directs the light from the first light source toward a first projector and the light output from the second light source toward a second projector. In the second operating state, the switching device directs the light output from the first light source toward the second projector and the light output from the second light source toward the first projectors.

29 Claims, 19 Drawing Sheets

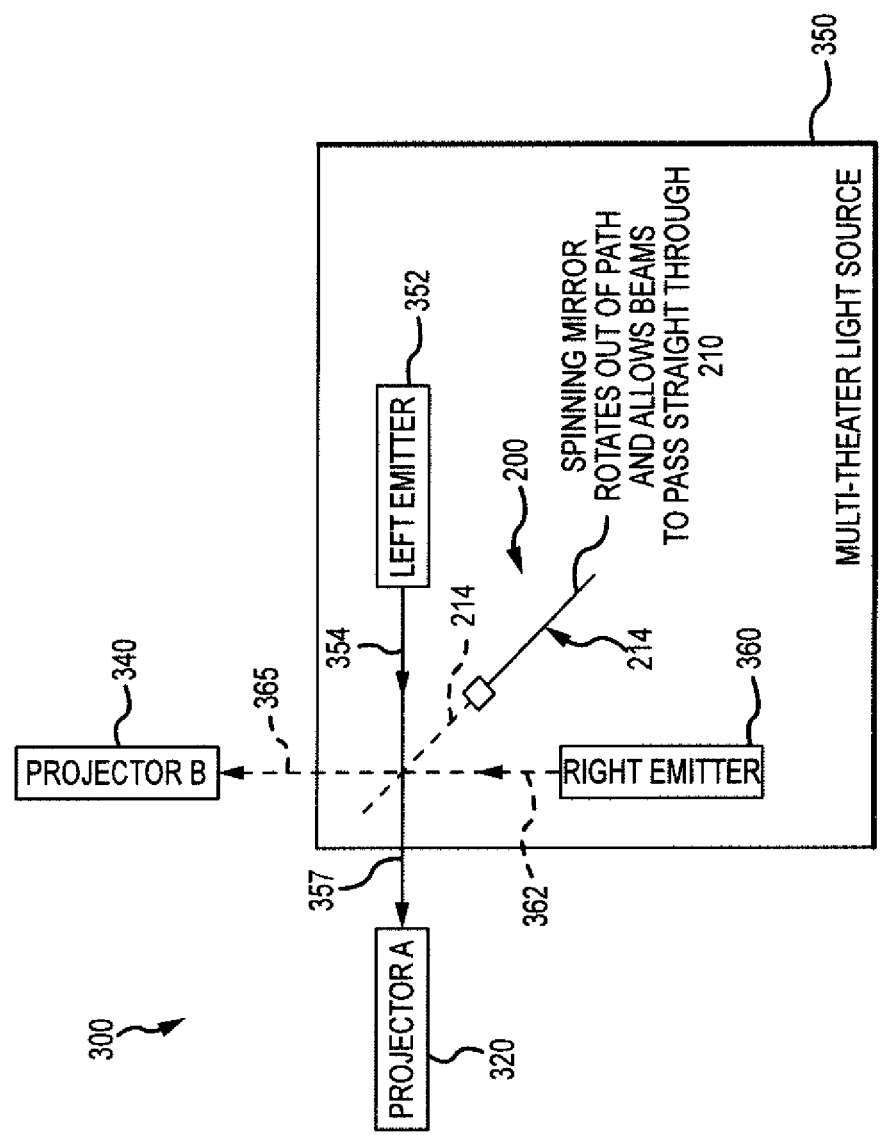

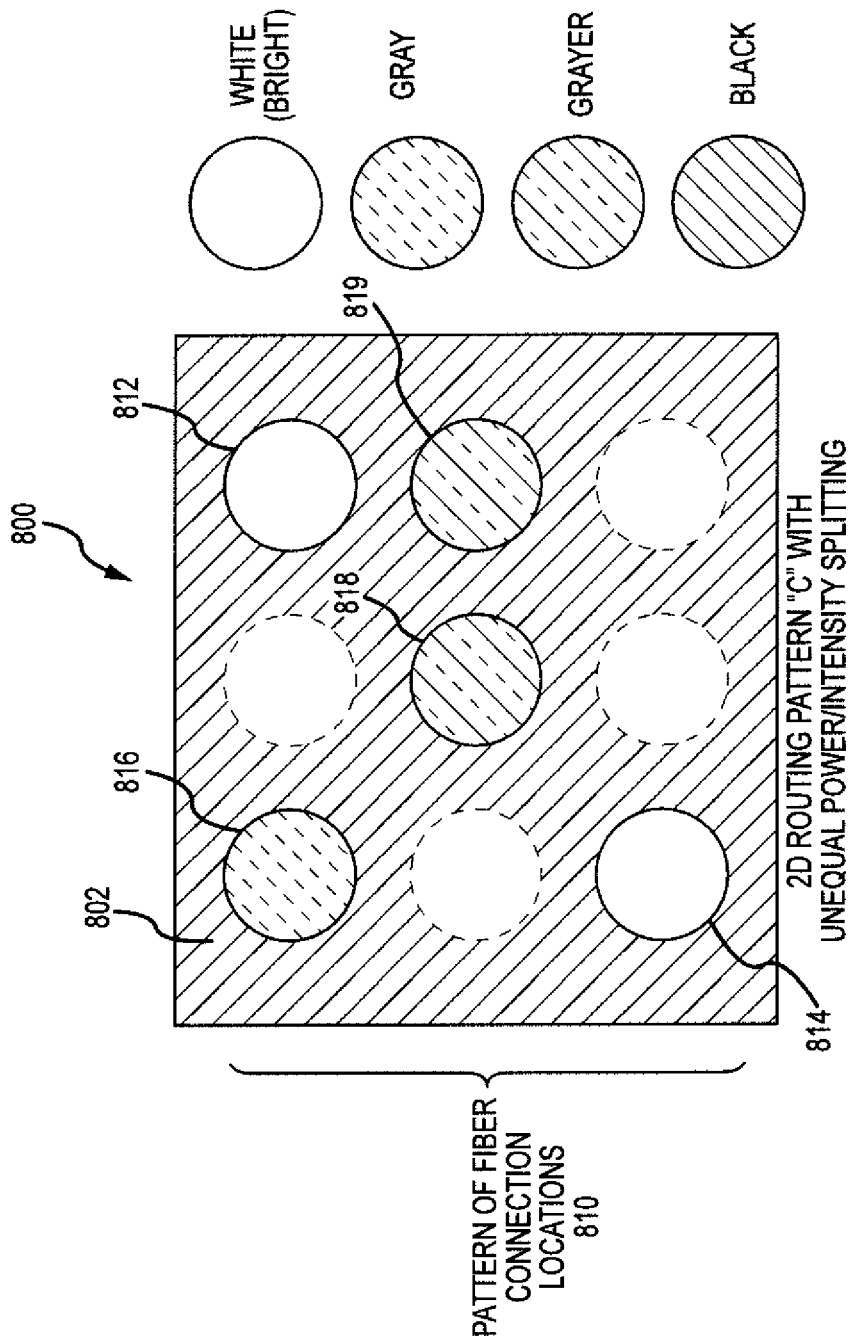

MULTI-THEATER LIGHT SOURCE

CROSS-REFERENCE TO RELATED APPLICATIONS

This application claims the benefit of U.S. Provisional Application No. 62/468,296, filed Mar. 7, 2017, which is incorporated herein by reference in its entirety.

BACKGROUND

1. Field of the Description

The present description relates, in general, to three dimensional (3D) projection and display technology including 3D glasses or stereo glasses worn by viewers to perceive 3D imagery and 3D projectors used to project left and right eye content into spaces and onto theater screens. More particularly, the present description relates to a light source system for providing light to 3D projectors (or projection devices or heads) that each provide 3D content or media and that are each located, typically but not necessarily, in different spaces (such as different theaters, different ride or show spaces in a theme park, cabins of different vehicles in a ride, and so on) and/or are generating separate 3D images/imagery.

2. Relevant Background

Recently, there has been an increased interest in providing movies and other image-based content to viewers in 3D form, and there has been significant research in the past on technologies to produce 3D imagery. Most 3D technologies require the viewers to wear 3D glasses (or other headgear or other filters, which will be labeled "3D glasses" herein) such that left eye images are received by their left eye and right eye images are received by their right eyes.

The combination of these right and left eye images are perceived by the viewers as 3D images or imagery (or stereo images), and 3D projection and display technology is used to create a stereo media environment for viewers including people in theaters and at theme parks such as in a cabins of passenger vehicles on an amusement park ride (e.g., a dark ride experience or the like) or in differing spaces of a ride or experience. Anaglyph, polarization, and wavelength multiplex visualization ("WMV") are the three main types of 3D technologies that are in widespread use to provide right eye light/imagery and left eye light/imagery in cinema applications and in other entertainment venues including amusement or theme parks (e.g., in 3D rides, 3D displays, and other park attractions).

With polarized technology, the viewer wears low-cost eyeglasses that contain a pair of different polarizing filters. Each of the viewer's eyes sees a different image (e.g., a right eye image and a left eye image that were captured by two cameras spaced apart the intraocular distance) because the filters pass only light having a particular polarization (i.e., matching the eyeglass filter) and block the light polarized differently (e.g., in the other polarization direction). Polarized technologies (linear and/or circular) are used to produce a 3D effect by projecting or displaying the same scene for viewing by both eyes, with the scene being depicted from slightly different offsets to create the necessary parallax to provide a 3D image. Use of this technology has the advantages of low cost glasses but is inefficient with light causing loss of brightness and requires a silvered screen to maintain polarization.

Due to these and other disadvantages with such 3D technologies, there has been increased interest in the use of wavelength multiplex visualization (also known as interference filters or comb filters and generally labeled "WMV" or "WMV technology" herein). WMV technology is based on a system of color. The specific color frequencies (e.g., left-eye RGB frequencies and right-eye RGB frequencies) utilized in each technology (or by each company's WMV products) is typically based on the specific delivery system and other parameters and company-specific goals.

Presently, there are several types of WMV technology used to provide 3D displays. One exemplary type of WMV-based 3D system is built on a fiber-coupled, 6-primary projection system architecture rather than filtered or polarized broad-spectrum white light. In some systems using this type of WMV, a 6-Primary ("6P") laser projector employs light laser light sources to provide right and left eye light. Particularly, each 3D light source (or laser-based light source) provides sets of red, green, and blue (RGB) laser lights, with one set being for the left eye and one with slightly different wavelengths for the right eye, which is why this second type of WMV-based 3D system is considered to employ or provide wavelength multiplex visualization. The "recipe" of wavelengths used may vary to achieve this second type of WMV-based 3D projection and for use in 3D glasses, with one exemplary system using a first or left laser projector providing light (red, green, and blue) at wavelengths of 465 nanometers (nm), 547 nm, and 657 nm and a second or right laser projector at 445 nm, 525 nm, and 637 nm. The viewer wears 3D glasses in these systems that filter out the different wavelengths and direct the colored light at the recipe-defined wavelengths to the intended eye. This type of WMV may be thought of as primary or colored laser projector-based WMV.

In general, current theater projection uses a light source per projector model. The theater is self-contained, and the light source often it integral with the projector (or projector device/head). A single bulb produces broad spectrum light that may be filtered as necessary to remove unwanted spectrum to provide the desired left and right eye light for the 3D technologies discussed above. For example, to present left eye/right eye stereo, the filters are color filters for anaglyph projection systems, are 6-P (six primary) filter systems or the like for WMV projection systems, and are polarization filters for polarization-based projection systems.

An ongoing issue with 3D projection systems is that a great deal of light is thrown away or wasted in the conventional filter-based projection system. In stereo projection, fifty percent or more of the bulb light is rejected by the filters to filter out unwanted parts of the spectrum. WMV projection systems such as 6-P systems rely on narrow bandwidth ranges so much more light is discarded if a broadband bulb is used. Hence, the 6-P light source used with each 6-P 3D projector typically includes a pair of narrow bandwidth light sources, such as two lasers (or laser banks), are used to provide left and right eye light for the projector. Unfortunately, lasers are expensive light sources, and 6-P 3D projection systems still typically require the use of dual projector systems on a single screen. To develop a single projector sequential 6-P 3D solution would typically waste half of the laser capability. Particularly, the proposed projector switches between projecting left eye content/media using left eye light from a first one of the lasers/lasers in the 3D light source and projecting right eye content/media using right eye light from a second one of the lasers/laser banks in the 3D light source. Hence, half of the laser capability of the 3D light source would not be used since the right-eye bank would run at a fifty percent duty cycle and the left-eye bank would run at the complimentary fifty percent duty cycle. At any given moment then, half of the expensive light is wasted and never makes it to the screen in a single projector sequential 6-P 3D solution.

Hence, there remains a need for techniques for more efficiently using light output from 3D light sources (e.g., sources of left and right eye light) in 3D projection systems. Preferably, these new techniques would be suited for many environments including theaters and theme parks and other facilities where 3D entertainment is provided to audiences wearing 3D glasses.

SUMMARY

The projection systems described herein utilize a multi-theater light source to provide left eye light and right eye light to two or more 3D projectors or display devices (e.g., any projection device and/or head or other display device such as a video monitor which might provide 6-P compatible 3D also using an alternating spectrum for its light source), and the 3D projectors may be located in differing space such as two different theaters, two portions/spaces in a theme park ride, two different cabins of a park ride, or the like. The inventors recognized that it would be desirable and more efficient to operate each of the laser sources (or right and left eye light sources) at full (or 100%) duty cycle rather than at half (or 50%) duty cycle as is the case in conventional 3D projection systems. The new multi-theater light source is operated to run both laser sources at 100% duty cycle and to route their output light between two or more projectors (e.g., two or more theaters or 3D display spaces).

To this end, the routing is generally achieved by providing a switch or optical switching device at (or downstream of) the outputs of two 3D light sources. For example, the switch or optical switching device is positioned in the multi-theater light source to receive (such as via optical fibers or the like) both the right and left eye light and to route or rapidly switch it from being delivered (via optical fibers or the like) to a first 3D projector in a first space to being delivered to a second 3D projector in a second space. The projection system includes a controller (which may be provided in the new light source) providing control or synchronization signals to the first and second 3D projectors to synchronize their operations for displaying left eye content while receiving left eye light and displaying right eye content while receiving right eye light (e.g., the light source signals the projectors to recognize the type of 3D light being routed each projector over time for proper synchronized operations).

The switch or optical switching device may take a variety of forms to practice the multi-theater light source. For example, some embodiments of the switch or router utilize photonic devices, other embodiments utilize a switch or router configured according to holographic technologies, and still other embodiments utilize a switch including a DMD (digital micromirror device) or DLP (digital light processing) chip. In another useful implementation, the switch or optical switching device is adapted to split light optically and to share the light from the 3D light source between two adjacent spaces (e.g., theaters) each with their own 3D projector. This switch may take the form of a mirror wheel that is placed between the laser sources/banks of the 3D light source and the two 3D projectors. The mirror wheel is rotated at a rotation rate useful for efficiently direct light in two directions (in an alternating manner between the two 3D projectors). Light pipes or fiber optics are used to improve coupling and/or hide the traveling laser in projection spaces. Additional mirrors can also be included to efficiently route light into facility friendly directions and locations. During operations, while one projector (or first theater/space) is receiving the output light of the left eye source, the adjacent or other projector (or second theater/space) is receiving the output light of the right eye source.

More particularly, an apparatus is provided for use as a light source for two or more projectors that can be positioned in different spaces and can be concurrently operated to project three dimensional (3D) imagery (e.g., two projectors in two theaters can concurrently display 3D movies). The apparatus includes a first light source outputting light configured for use by the projectors to display left eye content associated with the 3D imagery, and the apparatus also includes a second light source outputting light, concurrently with the outputting of the light from the first light source, configured for use by the projectors to display right eye content associated with the 3D imagery (e.g., lasers, laser banks, or the like providing left and right eye light according to an WMV specification such as 6-P light).

The apparatus further includes a switching device that receives the light output from the first light source and the light output from the second light sources. In a first operating state, the switching device directs the light output from the first light source toward a first one of the projectors and the light output from the second light source toward a second one of the projectors. In a second operating state, the switching device directs the light output from the first light source toward the second one of the projectors and the light output from the second light source toward the first one of the projectors. In many embodiments, the switching device operates to switch between the first and second operating states at a frequency of typically 120 Hertz or faster during operations of the apparatus.

The apparatus also may include a controller generating control signals to the first one of the projectors and to the second one of the projectors. The control signals are adapted to synchronize operations of the projectors to display left eye content when receiving the light output from the first light source and to display right eye content when receiving the light output from the second light source. The controller may also generate a park control signal to the switching device to remain in the first or second operating state for a predefined time period, whereby the light output from the first light source or the second light source is directed to the projectors for the predefined time period.

In some embodiments of the apparatus, the switching device includes a spinning disk with a first segment mirrored on first and second sides and a second segment that is transparent or substantially transparent to light. The disk is oriented, during the spinning, to alternate between having the first segment receiving the outputs of the first and second light sources in the first operating state and having the second segment receiving the outputs of the first and second light sources in the second operating state.

In other embodiments, the switching device includes a fiber-optical switch switchable between a bar state and a cross state. The output light from the first light source is directed to a first output port with the fiber-optical switch in the bar state and is directed to a second output port with the fiber-optical switch in the cross state. The first output port is coupled to an input of the first one of the projectors and the second output port is coupled to an input of the second one of the projectors.

In still other embodiments, the switching device, in the first operating state, displays first and second holograms on first and second display elements, respectively, to route the output light from the first and second light sources and, in the second operating state, displays the second and first holograms on the first and second display elements, respectively to route the output light from the first and second light sources. In the first and second operating states, the switching device routes the output light from the first and second light sources to at least three of the projectors. The first and second holograms are configured, in some cases, to provide unequal splitting of the output light from the first and second light sources, whereby at least one of the at least three projectors receives light of a differing intensity.

It will become clear from this summary and the following description and figures that the switch can be used to route light for other 6-P 3D applications as well. For example, the switch embodiments taught herein can be used for providing a switching backlight to be used with a flat screen monitor or with other types of projectors or optical devices or effects.

BRIEF DESCRIPTION OF THE DRAWINGS

FIGS. 3A and 3B illustrate a portion of a 3D projection system showing use of the switch of FIG. 2 as the system operates at first and second times with the switch's spinning mirror at two positions to route light to two different projectors (which may be in two spaces such as two different theaters);

FIG. 8 illustrates a 2D routing pattern for use as input to the 2D hologram generation process, with the 2D routing pattern providing different intensities or power levels to the subset of distribution fibers of a fiber optic array (e.g., providing an unequal splitting ratio to ends of optical fibers connected to the fiber optic array);

DETAILED DESCRIPTION

Figure 1:
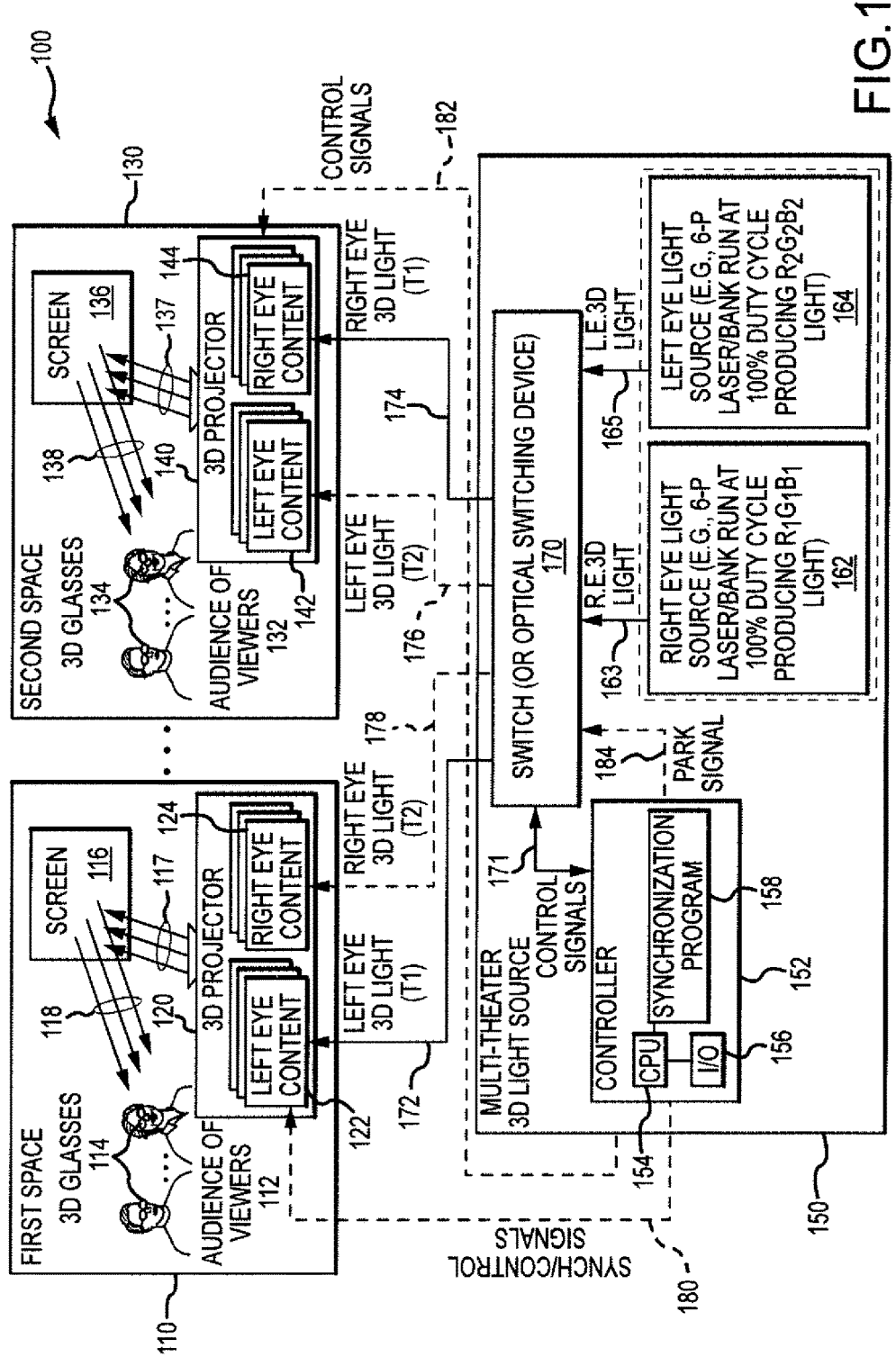
FIG. 1 is a functional block diagram of a 3D projection or display system making use of a multi-theater 3D light source of the present description showing a pair of 3D projectors positioned in two different spaces projecting 3D content for viewing by viewers wearing 3D glasses.

The present description is directed to a multi-theater light source for use in providing 3D light (left and right eye light streams) to two or more 3D projectors, which are operating to switch back and forth between providing 3D content intended for the left and right eyes of viewers in a space that are wearing 3D glasses. The inventors recognized that it would be very useful and less expensive to split laser light output from right and left eye emitters (laser or laser banks configured based on a particular WMX technology or the like) so that the emitters can operate at 100 percent duty cycle and so that the number of light sources required to run a 3D projection system with two or more projectors (e.g., two or more projection spaces such as 3D movie theaters) can be reduced by at least fifty percent.

The multi-theater light source used in the display or projection systems described herein is adapted generally to provide left eye light and right eye light in a switched manner to two or more light outputs/outlets (e.g., fiber optic connections). Hence, the multi-theater light source typically will include first and second lasers (or laser banks) that provide left eye light and right eye light (e.g., 6-P technologies would include one laser/laser bank providing $R_1G_1B_1$ light and one laser/laser bank providing $R_2G_2B_2$ light), and the two lasers are operated at 100% duty cycle (or continuously during operations of the display/projection system with the multi-theater light source).

The WMV or 3D technology is based on a principle of a left eye and a right eye system of light. The left eye of each viewer in an audience in one of the two or more theaters/spaces receives three narrow-band specific, primary red-green-blue wavelengths while the right eye receives three different narrow-band specific, primary red-green-blue wavelengths. The two or more 3D projectors (regardless of which WMV or light engine technology (laser or lamp) is used) uses the light from the multi-theater light source to deliver the left eye/right eye media content onto a projection surface (front or rear projection surface). The viewer wears special WMV-based 3D glasses (e.g., comb filter glasses suited to the particular recipe of wavelengths used by the WMV or 3D projector(s)) that transmit the information (i.e., light) selectively to the left and right eyes. In this way, any light produced by the 3D projectors is part of the 3D display system along with the matching WMV-based 3D glasses so that the projected light works with the 3D glasses (is viewable when transmitted from the projection surface to the viewer or into a viewing space).

For example, a typical dark ride in an amusement park may have one, two, or more sections or spaces in which 3D projectors are provided to project content onto projection surfaces and entertain riders in a passenger vehicle that are each wearing the matching WMV-based 3D glasses with 3D or stereo environment or display. In the movie theater setting, two or more theaters may be used to concurrently display 3D content to differing audiences wearing 3D glasses. In both of these applications, two (or more) projectors can concurrently make use of the output 3D light or split light from a single pair of left and right eye light emitters (e.g., 6-P laser banks configured for providing left eye light and right eye light) to project/display 3D content.

The splitting or switching of the output laser light can be achieved with a switch or optical switching device provided in the multi-theater light source, and the switch or switching device can be implemented in a number of ways. First, the switch or switching device can take the form of a spinning mirror/filter. Second, the switch or switching device can be implemented through the use of a DMD/DLP chip(s). Third, the switch may be a photonic device such as a high-speed 2x2 cross-bar switch. Fourth, the switch may be implemented using holographic techniques such as a holographic high power illumination distribution system. Each of these types of switches or routers may be useful in particular applications, and it may be useful to provide multi-theater light sources that are adapted or configured with unique switching techniques better suited for particular WMV technologies such as a different switching technique for Dolby 3D, Christie 6P, or other wavelength multiplex visualization technologies presently utilized or yet to be developed.

FIG. 1 is a 3D projection or display system 100 that includes and makes use of a single multi-theater 3D light source 150 of the present description to provide 3D imagery (such as 3D movies or the like) in two different spaces. Particularly, as shown, the system 100 includes a first space 110 and at least a second space 130. In the first space 110 (e.g., a movie theater, a ride space, a vehicle cabin on a ride, and the like), a first 3D projector 120 is shown to be operating to output 3D content 117 onto a screen or other surface(s) 116 that is reflected as shown at 118 to an audience of viewers 112 wearing 3D glasses 114. The first 3D projector (or projector device/head) 120 is operable in conventional ways to switch between displaying left eye content (e.g., a frame of a 3D movie intended for a viewer's left eye) 122 and right eye content (e.g., a frame of the 3D movie corresponding to the left eye frame) 124. The glasses 114 are configured to filter light 118 such that only left eye content 122 reaches the left eye and only right eight content 124 reaches the right eye with filters suited for the particular WMV or other 3D projection technology.

Similarly, in the second space 130 (e.g., another movie theater, another ride space, another vehicle cabin on the ride, and the like), a second 3D projector 140 is shown that operates to output 3D content 137 onto a screen or other surface 136 that reflects the light as shown at 138 to an audience of viewers 132 wearing 3D glasses 134. The second 3D projector (or projector device/head) 140 is operable in conventional ways to switch between displaying left eye content 142 and right eye content 144. As within the space 110, the glasses 134 are chosen to suit the 3D projector 140 (and the type of right and left eye light it is configured to use as input) to properly filter the light 138 to deliver left and right eye imagery to the proper eye of the viewer 132.

Significantly, the projectors 120 and 140 do not include a designated 3D light source as was the case in prior systems configured according to the conventional 3D light source per projector model. Instead, each of the projectors 120 and 140 has its operation configured to be synchronized (such as via control signals 180, 182 from controller 152) with receipt of left and right eye 3D light form a multi-theater 3D light source 150. To this end, the 3D light source 150 includes a right eye light source 162 and a left eye light source 164, and each of these are run at 100% duty cycle. For example, these light sources may be configured according to 6-P (or another WMV) technology as a 6-P laser/laser bank that output $R_1G_1B_1$ laser light and $R_2G_2B_2$ laser light on a continuous basis during operation of the system 100 as can be seen by light outputs 163 and 165.

The system 3D light source 150 further includes a switch or optical switching device 170 that is configured to be operated by control signals 171 from controller 152 to route the output light 163 and 165 from right and left eye light sources 162, 164 to the 3D projectors 120, 140 in the two spaces 110, 130. Particularly, the switch 170 operates at a first time (T1) to route the light 163 from the right eye light source 162 to the second 3D projector 140 in the second space as shown at 174 (such as over optical fibers from a space containing the 3D light source 150, which may be one of the two spaces 110, 130 or a differing third space) and concurrently to route the light 165 from the left eye light source 164 to the first 3D projector 120 in the first space as shown at 172 (again over optical fibers or the like). At a second time (T2), the switch 170 operates to route the light 163 from the right eye light source 162 to the first 3D projector 120 in the first space as shown at 178 and concurrently to route the light 165 from the left eye light source 164 to the second 3D projector 140 in the second space as shown at 176. At a next time period (T3), the switch 170 would operate in a similar manner to route light as in the first time period (T1) and such switching of the direction of the routing is repeated over time by the switch in response to the control signals 171.

The 3D light source 150 further includes the controller 152 that generates the control signals 171 to operate the optical switching device 170. To this end, the controller 152 is shown to include a processor/CPU 154 that manages/runs input/output devices 156 that are used to provide communication interfaces with other components of the 3D light source 150 including the switch 170 and also with other devices in the system 100 including the 3D projectors 120, 140 as shown with synch/control signals 180, 182. The I/O devices 156 may also allow an operator of the 3D light source 150 to initiate operations of the 3D light source 150 and input operating parameters such as the switch rate or frequency used by the 3D projectors 120 and 140 in sequentially showing left and right eye content, such as indicating spaces/projectors for directing the right eye light 163 and left eye light 165 from the switch 170 (such as when the light source 150 is used to supply 3D light to more than the two spaces 110, 130 shown in FIG. 1), and so on.

The controller 152 further executes code and/or runs software to provide the functions of a synchronization program 158. Particularly, the controller 152 acts to generate the control signals 171 to the switch and the synch/control signals 180, 182 to the 3D projectors 120, 140 so as to synchronize the operations of these three components of the 3D projection/display system 100. For example, as shown, the switch 170 is operated via control signals 171 to first (or during a first time period T1) direct/route left eye 3D light 172 to the first 3D projector 120 and concurrently to direct/route right eye 3D light 174 to the second 3D projector 140. Concurrently or in time synchronization, the first 3D projector 120 is operated via control signals 180 to present left eye content 122 so as to project left eye content 117 onto the screen 116 for reflection/distribution 118 to the viewers 112. Also, concurrently or in time synchronization, the second 3D projector 140 is operated via control signals 182 to present right eye content 144 so as to project right eye content 137 onto the screen 136 for reflection/distribution 138 to the viewers 132.

Then (or during a next time period T2), as shown, the switch 170 is operated via control signals 171 to second direct/route right eye 3D light 178 to the first 3D projector 120 and concurrently to direct/route left eye 3D light 176 to the second 3D projector 140. Concurrently or in time synchronization, the first 3D projector 120 is operated via control signals 180 to present right eye content 124 so as to project left eye content 117 onto the screen 116 for reflection/distribution 118 to the viewers 112. Also, concurrently or in time synchronization, the second 3D projector 140 is operated via control signals 182 to present left eye content 142 so as to project right eye content 137 onto the screen 136 for reflection/distribution 138 to the viewers 132. This switching continues to occur (such as at 120 Hz or higher switching frequencies) to concurrently create two 3D displays/effects in the two spaces 110, 130 with a single 3D light source 150 and with each of the right eye light source 162 and left eye light source 164 (e.g., lasers or laser banks configured to provide right and left eye light per a particular WMV technology) running at 100% duty cycle.

In some embodiments, the synchronization program 158 is configured to cause the controller 152 to generate a park signal 184 to the switch 170 during operations of the system 100 in which the projectors 120 and 140 are being operated to project 2D content. In this configuration, the switch 170 operates to direct either right eye light 163 or left eye light 165 to each of the projectors 120, 140, and it does not perform switching during such 2D display operations. This "park" features of the multi-theater 3D light source 150 provides better light use efficiency and allows the source 150 to be better utilized when the spaces 110, 130 are not being used for 3D displays/movies such as when a cinema complex replaces two 3D movies with two 2D movies.

Figure 2:
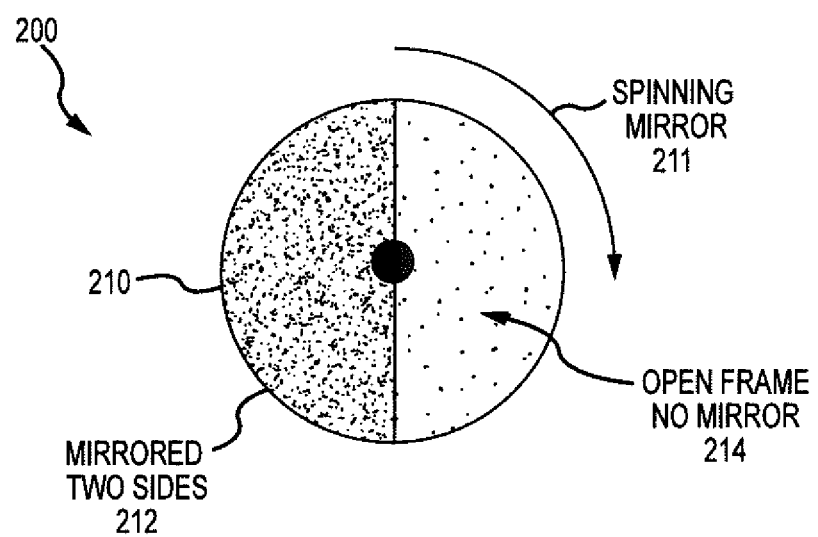
FIG. 2 illustrates a portion of a spinning mirror switch that may be used for a switch or optical switching device to implement the multi-theater light source of FIG. 1.

As noted above, the switch 170 of FIG. 1 may be implemented with a variety of technologies useful for splitting or routing light/beams from laser sources such as light sources 162, 164 in source 150. For example, a spinning mirror design may be utilized to implement the switch 170. In this regard, FIG. 2 illustrates a portion of a spinning mirror switch 200 that may be used for a switch or optical switching device 170 to implement the multi-theater light source 150 of FIG. 1. As shown, the switch 200 includes a disk-shaped mirror 210 that in the switch 200 is selectively spun about its central axis as shown with arrow 211, and the rotation rate for spinning 211 is chosen to achieve the desired switching frequency, which is synchronized with projectors' switching between left and right eye content. The disk-shaped mirror 210 has a first segment or body half 212 that is mirrored on both sides to reflect received light from either side. The disk-shaped mirror 210 further includes a second segment or body half 214 that is not mirrored and is fabricated to be transparent to received light (e.g., provides an open frame). With this configuration, light that strikes either side of the first segment 212 will be reflected while light that strikes either side of the second segment 214 will be passed through the disk-shaped mirror 210.

Figure 3A:
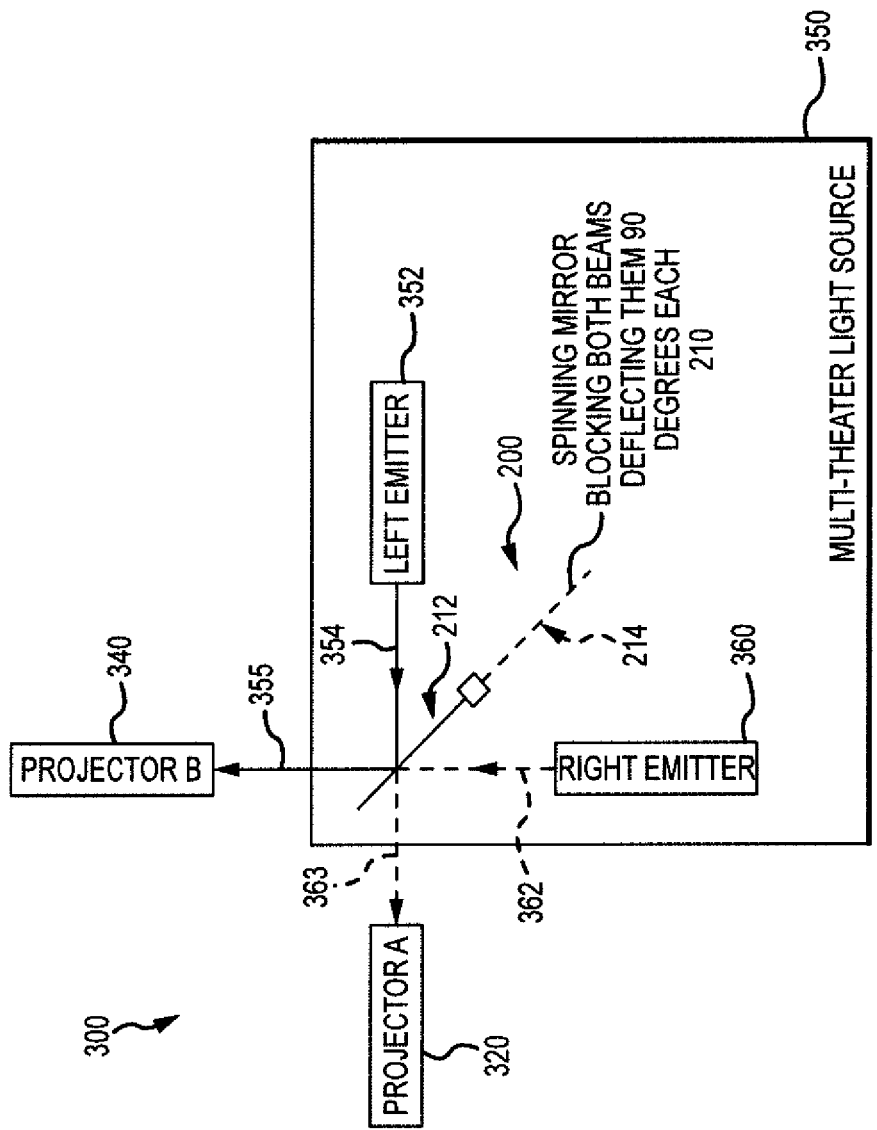

FIGS. 3A and 3B show the use of the switch 200 in a 3D projection or display system 300. As shown, the system 300 includes first and second projectors 320, 340, which may be configured similar to projectors 120 and 140 of FIG. 1 to switch back and forth over time between displaying left eye content and right eye content (with one projector typically projecting left eye content while the other is projecting right eye content). The system 300 further includes a multi-theater light source 350 with a left emitter (or source of left eye light for 3D projection) 352 and a right emitter (or source of right eye light for 3D projection) 360. The light source 350 also includes the spinning mirror switch 200 of FIG. 2, and FIGS. 3A and 3B show the spinning mirror switch 200 during switching or routing operations at a first time or operating state and at a second time or operating state, respectively.

Specifically, in the first operating state or during the first operating time period of FIG. 3A, the spinning mirror 210 is in a first rotational position. In this position, the mirror segment 212 is placed downstream of both the left and right emitters 352, 360 to be in the light paths of the emitters 352, 360. As a result, the output left eye light 354 strikes a first side of the mirrored segment 212 and is reflected as shown at 355 for delivery to (or for routing to, such as via optical fibers) a second projector 340. Concurrently, the output right eye light 362 strikes a second side of the mirrored segment 212 (opposite the first side) and is reflected as shown at 363 for delivery to (or for routing to, such as via optical fibers) a first projector 320. During this first operating state or time period, the first projector 320 has its operation synchronized with switch 200 so as to project right eye content with the received laser light 363. Concurrently, the second projector 340 has its operation synchronized with switch 200 so as to project left eye content with the received laser light 355.

In the second operating state or during the second operating time period of FIG. 3B, the spinning mirror 210 is in a second rotational position (rotated 180 degrees from the rotation position of FIG. 3A). In this position, the transparent or window segment 214 is placed downstream of both the left and right emitters 352, 360 to be in the light paths of the emitters 352, 360. As a result, the output left eye light 354 strikes a first side of the transparent/window segment 214 and is passed or transmitted through as shown at 357 for delivery to (or for routing to, such as via optical fibers) the first projector 320. Concurrently, the output right eye light 362 strikes a second side of the transparent/window segment 214 (opposite the first side) and is passed or transmitted as shown at 365 for delivery to (or for routing to, such as via optical fibers) the second projector 340. During this second operating state or time period, the first projector 320 has its operation synchronized with switch 200 so as to project left eye content with the received laser light 357. Concurrently, the second projector 340 has its operation synchronized with switch 200 so as to project right eye content with the received laser light 365.

Figure 4A:
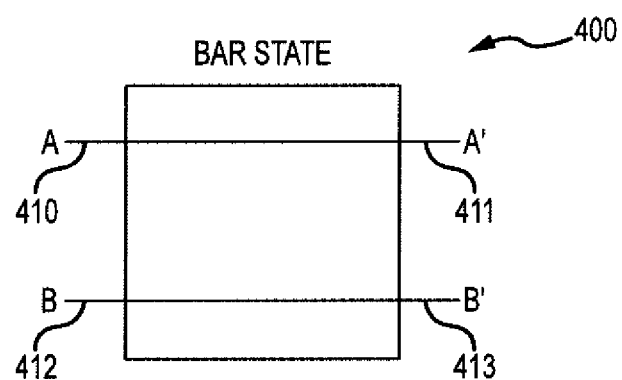
FIGS. 4A and 4B illustrate a 2×2 cross-bar switch in a bar state and in a cross state, respectively, as may be used to implement the switch in the multi-theater light source of FIG. 1.
Figure 4B:
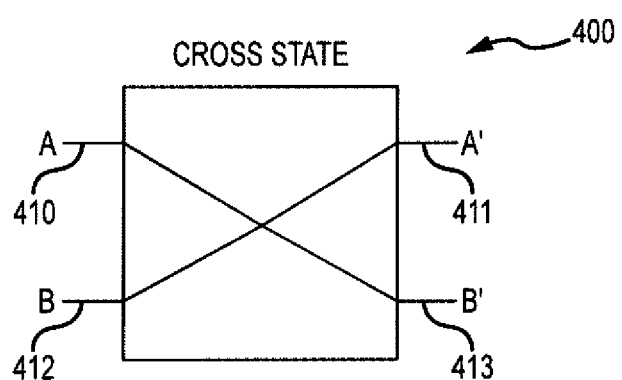

In other embodiments of system 100, the switch or optical switching device 170 is implemented through the use of a high-speed 2×2 cross-bar fiber-optical switch. Such a switch configuration is useful to provide high-power illumination routing from multi-kilowatt fiber lasers such as may be used to implement the left and right eye sources 162, 164 in light source 150 in FIG. 1. FIGS. 4A and 4B illustrate schematically a high-speed 2×2 cross-bar fiber-optical switch 400 in a bar state and in a cross state, respectively, and the bar state of FIG. 4A may correspond with a first operating state or time period (as discussed above for switch 200) while the cross state of FIG. 4B may correspond with a second operating state or time period (as discussed above for switch 200).

Figure 5:
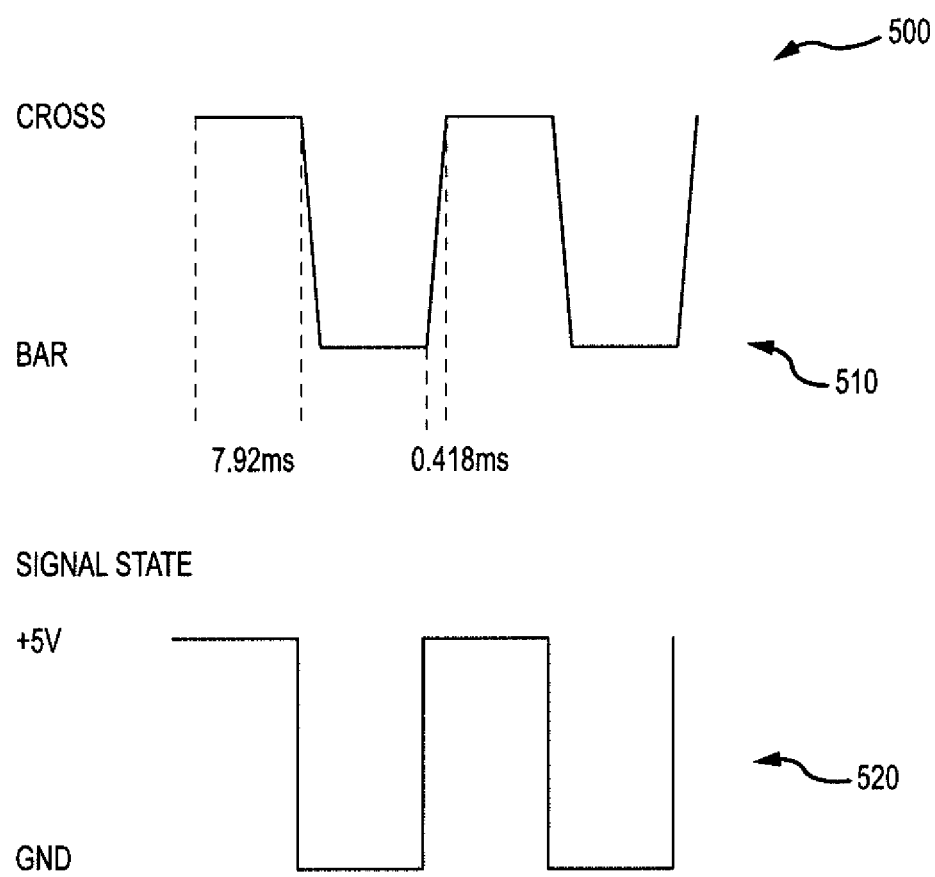
FIG. 5 illustrates graphically switching times and signals for the switch of FIGS. 4A and 4B.

As shown, the switch 400 has two input ports 410 and 412 and two output ports 411 and 412. The two input ports 410, 412 would be provided in a multi-theater light source to accept light from the two light sources (e.g., fiber lasers, laser banks, and the like) such as by accepting an optical fiber carrying white light composed of three narrowband RGB components (e.g., the two fibers' RGB components are different (right and left eye 3D light) and non-overlapping (e.g., $R_1G_1B_1$, $R_2G_2B_2$) as may be delivered by two separate fiber lasers operating on a 100% duty cycle). Each of the two output ports 411, 413 couple into optical fibers, and the output fibers lead to separate digital 3D cinematic projectors (which may be configured for 6-P laser illumination of left and right eye content (or 3D content)). The switching time between configurations preferably is relatively short such as below 0.417 ms (including signal response time) so that the switch 400 remains stable in each state (e.g., 95 percent of the time) when switched at a rate of 120 Hz (e.g., 7.92 ms at 120 Hz, 0.418 ms switching time). FIG. 5 illustrates a combination graph 500 showing with upper graph 510 the switching times during operation of the switch 400 and showing with lower graph 520 signal states during the operation of the switch 400.

During operations of a multi-theater light source as shown in FIGS. 4A and 4B, the fiber-optical switch 400 alternates repeatedly between bar (A to A', B to B') and cross (A to B', B to A') configurations. Switching occurs in response to an electronic TTL signal (such as signal 171 from controller 152 as shown in FIG. 1), typically at a switching rate of at least 120 Hz. The switch 400 is in the bar state shown in FIG. 4A when the TTL signal is GND and in the cross state as shown in FIG. 4B when the TTL signal is +5V (for example). The switching time between configurations preferably is relatively short such as below 1.67 ms (including signal response time) so that the switch 400 remains stable in each state (e.g., 80 percent of the time) when switched at a rate of 120 Hz (e.g., 6.67 ms at 120 Hz, 1.67 ms switching time). FIG. 5 illustrates a combination graph 500 showing with upper graph 510 the switching times during operation of the switch 400 and showing with lower graph 520 signal states during the operation of the switch 400.

Insertion loss is preferably kept to a minimum (or lower value) to maintain light efficiency and to avoid unwanted raised temperature effects and effects related to power dissipation. The typical 1 dB insertion loss (or 20% loss) for optical switches may be the maximum acceptable for use of the switch 400 in a multi-theater light source. Cross talk attenuation between channels also preferably is kept low such as below 30 dB ($^1/_{1024}$~0.001=30 dB) or one gray level in a 10-bit display (i.e., in the bar state shown in FIG. 4A, the cross talk of unwanted A to B' should be 0.001 A and in the cross state shown in FIG. 4B, the cross talk of unwanted A to A' should be below 0.001 A (and the same applies for the complimentary channel B)).

In other embodiments, the switch or router 170 of FIG. 1 is implemented through the use of holographic distribution techniques. These may take the form of the holographic distribution assemblies taught in U.S. patent application Ser. No. 14/662,913, which is incorporated herein by reference, such as by including two of such holographic distribution assemblies with one being provided for each of the left and right eye light sources (e.g., sources 162 and 164 in FIG. 1). The following description presents a description of such holographic distribution assemblies as they may be used to provide the switch/router 170 (e.g., display different holograms on two holographic display elements to direct the left and right eye light to different projectors (theaters or other spaces)). It will be seen that these holographic distribution assemblies may be desirable for use when three, four, or more projectors are sharing a multi-theater light source (such as source 140 in FIG. 1) as the output of the holographic distribution assembly can be used to switch light distribution rapidly between 2 to 4 or more projectors and the splitting of the left and right eye light can be equal or can be differing percentages.

Figure 6:
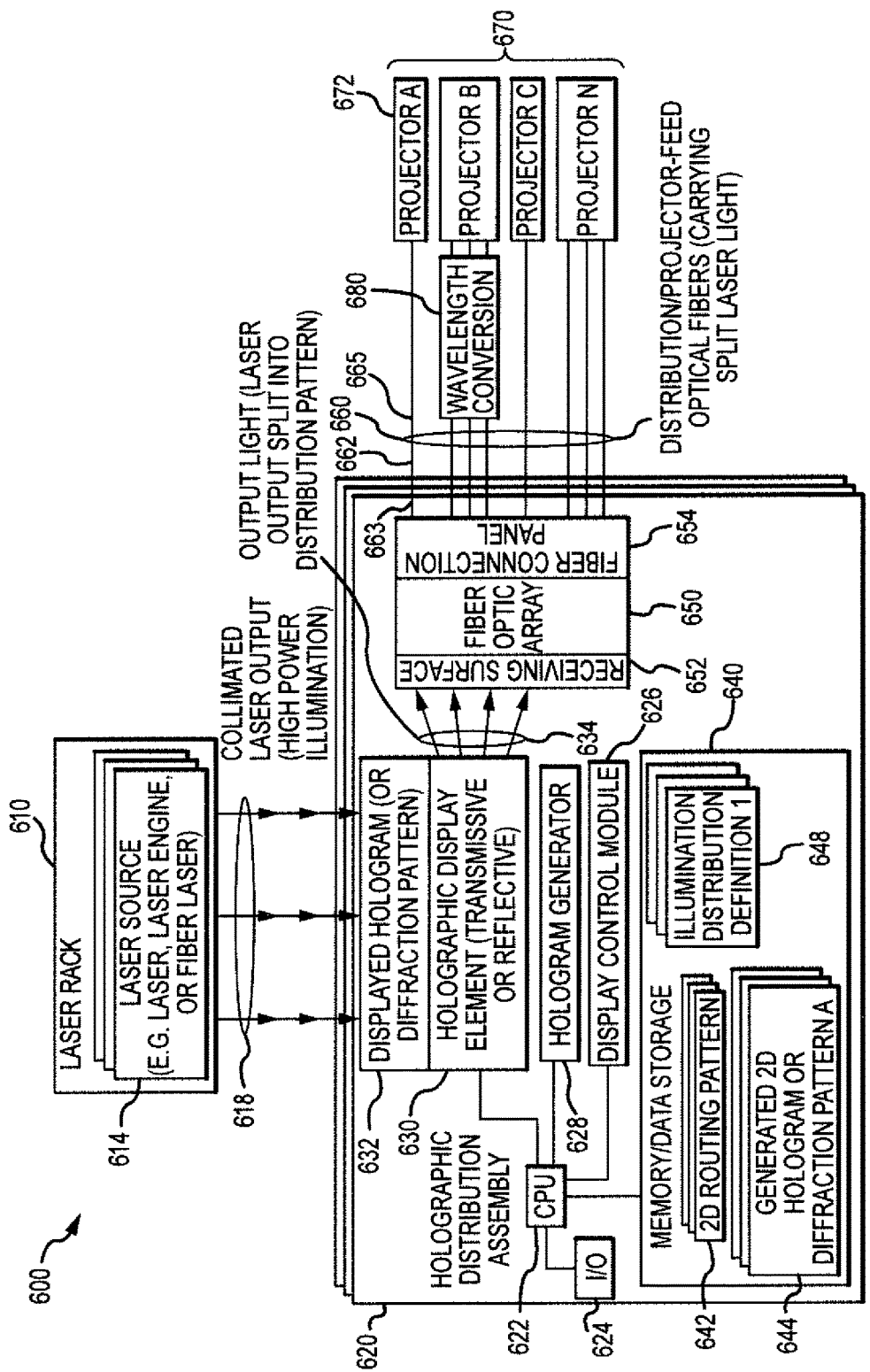
FIG. 6 is a functional block diagram of a holographic high power illumination distribution system with a holographic distribution assembly that may be used to implement the switch/router of the multi-theater light source of FIG. 1.

FIG. 6 illustrates a system 600 that is adapted to split and distribute, in a switching or time-multiplexed manner in some cases, high-power illumination such as laser light or output from one-to-many lasers. The splitting and distribution is achieved through the use of holographic technologies including use of a displayed hologram to split and direct the laser light onto a fiber optic array (or fiber distribution panel). As shown, the high power illumination or laser light 618 (such as left or right eye light from a laser or laser bank as shown at 162 and 164 in the 3D light source 150 of FIG. 1), which may be collimated by optics in the system 600 prior to delivery to a holographic display element 630, is provided by a laser rack 610. The laser rack 610 may take the form of one or more laser sources 614 configured to provide left or right eye 3D light that may be located remote from a set of projector/projection devices 670, e.g., a centrally located laser 614 may be used to provide high power illumination to a plurality of projector heads in one or more theaters, one or more theme ride sections, and so on. The output or laser light 618 can be "high power" in that it may range from several hundred mWatts up to hundreds of Watts and even up to the kilowatt range (e.g., each of the projectors 670 may be 10 to 20 Watt-rated devices and a fiber laser providing 100 to 500 Watt output 618 may be used to drive operation of several to many of the projectors 670 by splitting and then distributing the laser light 618 to the projectors 670).

To divide and distribute the high power illumination/laser light (which may be right or left eye 3D light), the system 600 includes a holographic distribution assembly 620, and two of these may be used in a multi-theater 3D light source 150 to provide the switch/router 170 to route light from sources 162 and 164. The assembly 620 may include one or more processors 622 to manage and operate components such as input/output (I/O) devices 624, memory/data storage 640, and holographic display element 630. Further, the processor 622 may be used to run or execute software or computer programs (in any useful programming language and based upon an operating system) such as a display control module 626 and a hologram generator 628. The I/O devices 624 may include keyboards, a mouse, a touchscreen, and a user interface (GUI) provided on a monitor or touchscreen, and the I/O devices 624 may be operated by a user of the system 600 to initiate the hologram generator 628 and to selectively control the holographic display element in a desired manner (e.g., using one or more of the illumination distribution definitions or programs 648 as explained below). For example, a user may use the I/O devices 624 to distribute (switch/route) the light 618 in a desired manner (e.g., setting splitting ratios and timing of delivery of light 660) to the projectors 670 to achieve a desired projection effect(s).

As shown, the assembly 620 includes a holographic display element 630 such as a spatial light modulator (SLM) that may be transmissive or reflective of the collimated laser output 618. To divide or split the light, the holographic display element 630 is operated by a display control module 626 and processor 622 to display a hologram or diffraction pattern 632, and the laser output 618 is directed (via optics in some cases in a collimated manner) onto or through the displayed holograph/diffraction pattern 632. The hologram 632 may be configured to split the laser output 618 into one, two, three, or many more streams or beams of light/illumination 634 that are directed onto a receiving surface 652 (or input portion) of a fiber optic array 650, perhaps through intervening optics in some cases. A plurality of distribution optic fibers 660 are connected at first ends to a fiber connection panel 654 of the fiber optic array 650 to receive the split beams/portions 634 and deliver/distribute the split light 634 to projectors 670 (or projector heads) via a second or distal end of each fiber 660 and, in some cases, via a wavelength conversion device 680.

For example, one or more portions 634 may be delivered to fiber 662 with a first end 663 connected to the fiber connection panel 654 and with a second end 665 connected (i.e., optically linked) to a projector 672 (or its projector head), and, in response, the projector 672 operates to project left or right eye 3D content using this portion 634 of the laser output 618 from the laser source 614 of the rack 610 to project chosen imagery. In a typical multi-theater 3D light source such as source 150 two of the holographic display elements may be utilized to route/split the right and left eye light 618 (e.g., so that a complete assembly 620 may not be required for each of the left and right eye sources 162, 164 but, instead, two holographic display elements 630 may be used and a single fiber optic array may be used to route the split light 662). Note, in some cases, the assembly 620 may act simply as a switch without splitting of the light 618 by displaying differing holograms 632 on each of two holographic display elements 630 at each operating state/time period, such as when there are only two 3D projectors in system 100 as shown in FIG. 1 (e.g., 100 percent of the left eye light may be directed to a 3D projector with the displayed hologram 632 rather than a fraction to two or more 3D projectors).

The displayed hologram 632 is typically created or generated by the hologram generator 628 based on an input 2D routing pattern 642, which may be stored in memory 640. As shown, the memory 640 is used to store a plurality of 2D routing patterns 642 and/or pregenerated 2D holograms or diffraction patterns 644 related to the 2D routing patterns. Each defines a set of fiber connection locations on the connection panel 654 of the optic array 650 to which it is desired to deliver a fraction or portion of the laser output 618 via streams/beams 634 from the holographic display element 630.

For example, the optic array 650 may be adapted to have 12 fibers 660 optically connected to the panel 654 at 12 different connection locations. The 2D routing pattern may be designed to define the locations (and size and shape of the fiber ends/inlets) of a subset of the fibers connected at these 12 locations so as to direct the light 634 into a subset of the fibers. As is discussed below, the splitting of the power/illumination may be equal or may be provided using unequal ratios, e.g., 4 fibers of the 12 distribution fibers may each receive 25 percent of the illumination or one or more of the fibers may receive a different amount of illumination (e.g., send 20 Watts to 2 projectors 670 and 40 Watts to 2 projectors and so on) from a left or right eye 3D light source 610.

Each routing pattern 642 is converted into a 2D hologram or diffraction pattern by the hologram generator 628 and stored in memory 640 as shown at 644. A user may then use the I/O 624 to choose to play via display control module 626 one of the generated 2D holograms 644 as a displayed hologram/diffraction pattern 632 on the display element 630 to achieve a splitting of light 634 onto the fiber optic array and delivery of light via fibers 660 to a subset of the projectors 670 (e.g., all or a number of the projectors 670 may receive fractions of the light 618 from the laser rack 610 using the displayed hologram 632). The hologram generator 628 may be configured to provide the 2D hologram using a Fourier transform or similar computation, e.g., to generate a Fourier Fresnel hologram or diffraction pattern. The generation of holograms using such computations is well known in the holographic industry such that detailed explanation is not provided in this description as conventional (or yet to be developed) techniques can be used to transform a 2D image into a 2D hologram, with an important aspect here being the creation and use of a hologram 644 from a 2D routing pattern 642 for distributing output of a laser rack 610.

A single 2D routing pattern 642 (and therefore 2D hologram 644) may be chosen by a user via the I/O 624 to distribute illumination from the laser rack 610. Then, when it is desired to add or delete a projector 670 or to change the ratio of delivered illumination 634 to the array, a new 2D routing pattern 642 may be selected or created and transformed into a new 2D hologram 644 for use in displaying a hologram 632 on the holographic display element 630. This allows relatively easy and quick "plug-and-play" of projectors 670 or changing of their outputs. However, in many cases, it is desired to switch between projectors 670 or change outputs of the projectors 670 over time or in a time multiplexed manner. In such cases, an illumination distribution definition 648 may be established and/or chosen by a user via the I/O 624 for use by the control module 626 in choosing a set of the holograms 644 for providing the output light 634 to the array 650 in a switched manner (e.g., where to direct left (or right) eye light at a first operating state (or first operating time period) and where to direct left (or right) eye light at a second operation state (or second operating time period)).

For example, each of the distribution definitions 648 may identify two of the 2D holograms 644 for each of two holographic display elements 630 associated with left and right eye light sources 610 to play/display upon the display elements 630 during an operation period of the system 600 to project 3D imagery. Each of the distribution definitions 648 may further define an order the 2D holograms 644 will be displayed on the display element 630 and the timing of such displays. This timing may involve rapid switching between holograms (e.g., to deliver light to right and left eye projectors 672). The display element 630 is chosen to be able to carry out the desired switching speeds such as to support switching for 3D effects by rapidly switching between two or more of the generated 2D holograms 644 to display the hologram or diffraction pattern 632 to provide the desired splitting/dividing of high power illumination 618 as shown at 634.

Figure 7A:
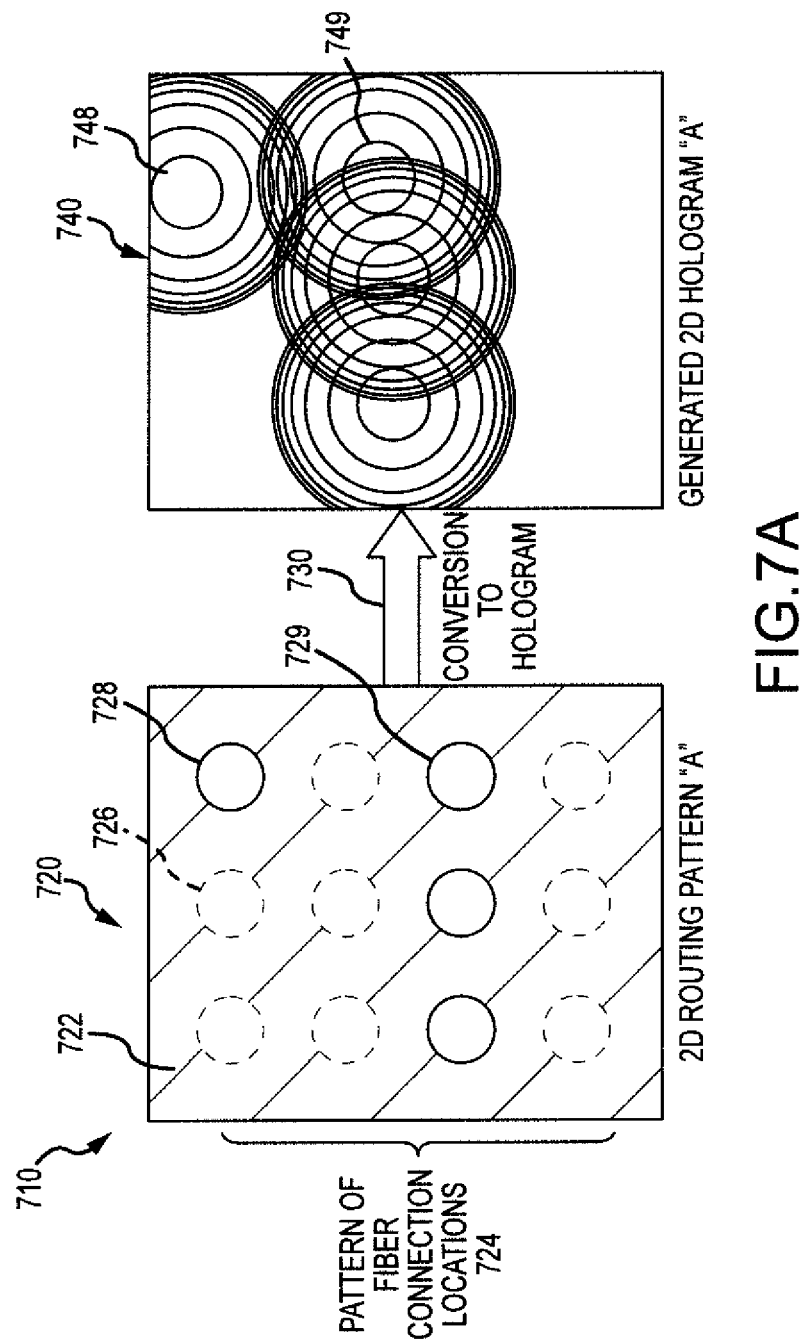
FIGS. 7A and 7B schematically illustrate generation of two different 2D holograms for use in feeding laser output, in two different ways (which can be provided in a switched manner or time-multiplexed manner) to a fiber optic array.
Figure 7B:
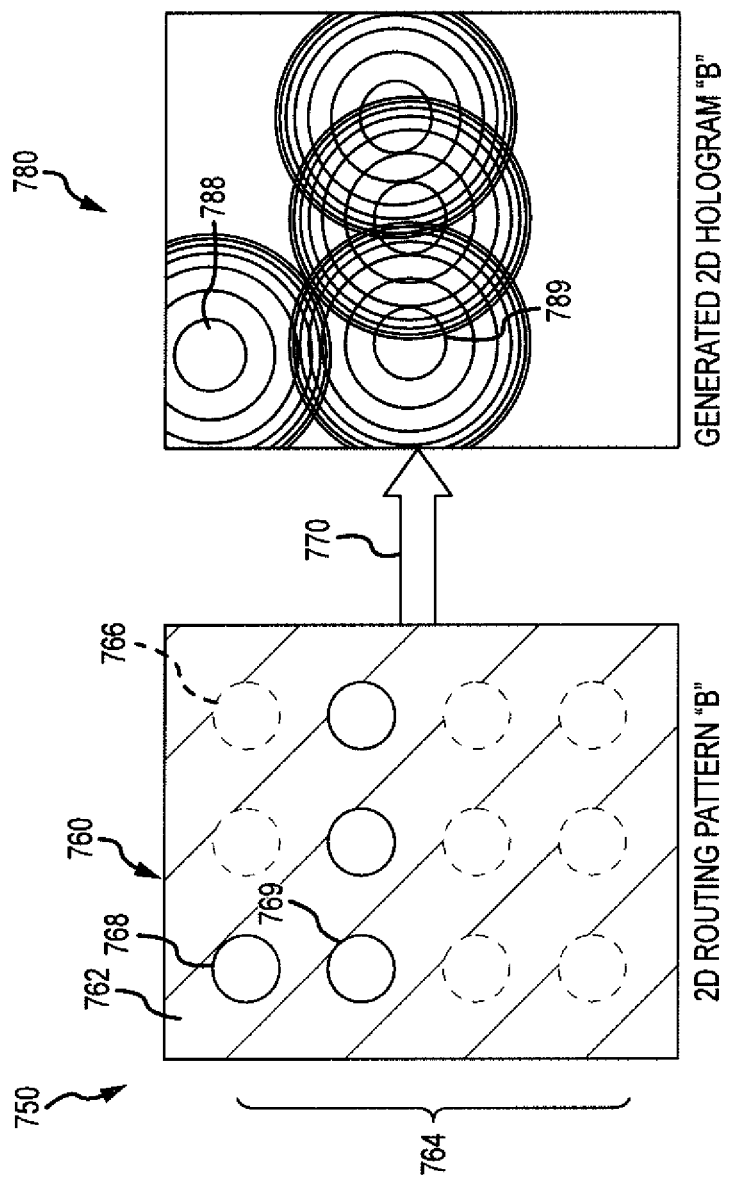

FIGS. 7A and 7B illustrate schematically the generation of routing holograms or diffraction patterns for use in a distribution system such as system 600 of FIG. 6. FIG. 7A shows a first 2D routing pattern 720 that may be used to define routing or splitting of a laser output to a set of twelve different optic fibers (or fiber connections) of a fiber optic array. The overall pattern of fiber connection locations is shown at 724 with four rows of three connection locations, although the fiber connection locations do not necessarily need to be laid out in a grid and may be randomly located or the locations may be designed to minimize potential crosstalk between fibers. The 2D routing pattern 720 is dashed as shown at 722 in areas of the optic array where no laser light or illumination is to be directed, and this may include a number of the fiber connection locations including connection location 726. In contrast, the 2D routing pattern is bright or white at locations where laser light or high power illumination is to be delivered and these fiber connection locations include locations as shown at 728 and 729.

A transform is performed at 730 to convert the 2D routing pattern 720 into a 2D routing hologram or diffraction pattern 740. This hologram 740 includes a set of diffraction patterns as shown at 748 and 749 that act to split light reflected from or transmitted through the hologram 740 onto the four connection locations provided in 2D routing pattern 720 (with the correct optics provided between the display element and the receiving surface of the fiber optic array). In this example, the laser light is split equally (or equal ratios) to each of the four connection locations 728, 729 such that one fourth of high power illumination is provided to each of the distribution fibers connected to the array at the connection locations.

To switch the distribution of illumination, a second 2D routing pattern 760 may be used and transformed as shown in the process 750 of FIG. 7B. As shown, the 2D routing pattern 760 also has a pattern of connection locations 764 made up of four rows of three connection locations for distribution fibers of a fiber optic array. Again, black or darkened areas 762 would not receive any of the distributed illumination, and, in pattern 760, this may include connection locations that previously received a portion of the laser light such as location 766. White or brighter areas 768, 769 (which, in this case, were black/darkened/dashed in the first pattern 720) defined a set or number (here four) of the connection locations to which it is desired to direct or distribute a fraction/portion of the high powered illumination with a hologram. The overall incident illumination 618 may be adjusted as more illuminated connection locations (e.g., as shown at 768, 769) are added so that the overall illumination is increased. In this way, the existing projected illumination at each of the illuminated connection locations stays constant while the newly added illumination connection has the desired illumination level.

At 770, a Fourier transform or other conversion process is used to generate a 2D routing hologram 780 based on the 2D routing pattern 760, and the generated hologram 780 includes a number of diffraction patterns 788, 789 corresponding to the bright areas 768, 769 that cause light striking or passing through the hologram 780 (when it is displayed on a display element) to diffract toward or onto the connection locations associated with areas 768, 769 of a fiber optic array. Again, each of the connection locations 768, 769 has been defined with an equally bright object such that the high powered illumination is equally split or divided among the four distribution fibers optically linked to the fiber optic array at the four connection locations 768, 769.

In the examples of FIGS. 7A and 7B, the 2D routing patterns 720 and 760 were designed to equally divide the high power illumination from a laser (or laser rack) and direct it onto connection locations of a fiber optic array. In other cases, though, it may be desirable and useful to divide the high power illumination or laser light into unequal fractions or ratios. For example, it may be desirable to use projector heads with differing power ratings in a projection system such as in differing parts of an amusement park attraction or ride. In these cases, it would be useful to deliver portions of the illumination that suit each projector (e.g., at or near its power rating) rather than simply equally dividing the laser light from the laser rack. To this end, the 2D routing pattern may be designed to define the unequal splitting ratios or fractions to be used in the distribution.

For example, FIG. 8 illustrates a 2D routing pattern 800 that defines unequal splitting ratios of high power illumination using a gray-scale technique. As shown, the 2D routing pattern 800 may be used to choose which of nine different fiber connection locations 810 are to receive high power illumination and how much of the power will be provided to each chosen location. To this end, darkened, full blackened, or striped areas including some of the connection locations 810 will not receive any light (when a 2D hologram is generated from the 2D routing pattern 800). Areas that are fully white or brightest such as locations 812, 814 will receive greater portions of the high power illumination while areas that are a first gray scale such as the dashed/solid striped connection location 816 will receive a fraction of the illumination that is some amount less than the white/brighter colored locations 812, 814 and areas that are colored a second gray scale such as dashed/solid striped connection locations 818 and 819 will receive a fraction of the illumination that is an amount less than locations colored the brighter gray scale such as location 816. In this way, an almost infinite range of unequal ratios may be defined to the various fiber connection locations 810 to unequally distribute or split illumination using a hologram generated from the 2D pattern 800 (e.g., some SLM devices may provide hundreds of gray scale definitions that can be used to set a wide range of splitting or distribution ratios for the connection locations 810 of a 2D routing pattern 800).

As can be seen from the systems and devices of FIGS. 6 to 8, the inventors are proposing the use of a holographic, high-power illumination distribution module or assembly as part of the switch or optical switching device 170 of FIG. 1 because it can handle high optic power laser inputs and can provide high speed, reconfigurable interconnections with flexible splitting ratios into a fiber array. In some embodiments, the distribution of the laser light is made more efficient by using a hologram in the form of a blazed grating hologram as shown with particular index of refraction profile to provide desired diffraction angles (or reflection angles in the SLM) across the hologram. As discussed earlier, the hologram is generated based on a 2D routing pattern for directing light to particular fiber connection locations on the fiber optic array.

Figure 9:
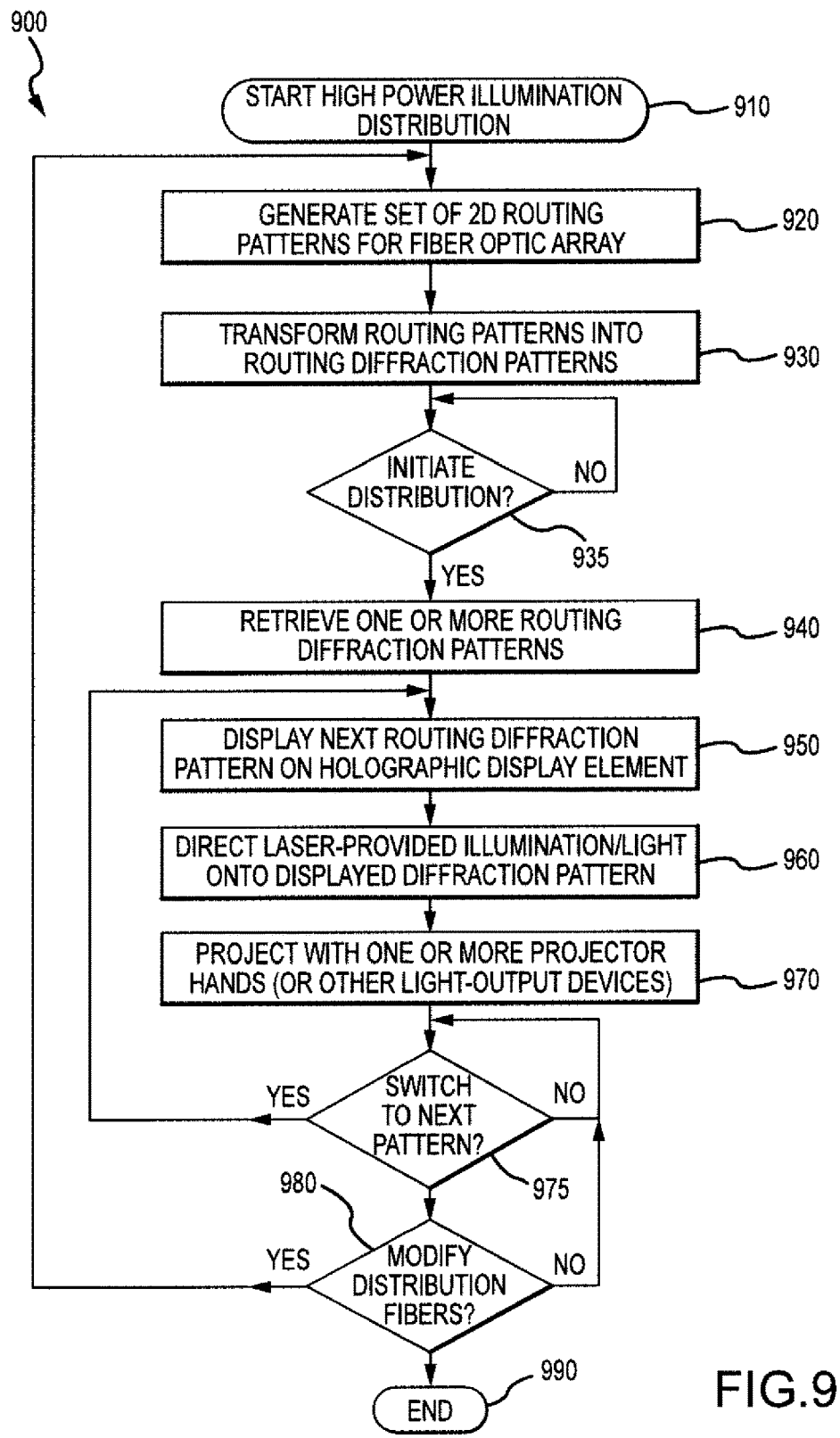
FIG. 9 is a flow diagram for a method of performing or providing distribution of high power illumination (e.g., distributing outputs of a laser farm to a plurality of projection devices)

FIG. 9 illustrates a method of distributing high power illumination such as may be carried out by operating of system 600 of FIG. 6. The method 900 starts at 910 such as with providing a pair of left and right eye laser sources, with coupling one or more laser outputs with a switch 170 with one or more holographic distribution assemblies (e.g., two SLMs with a controller for selectively displaying holograms on the SLMs to distribute split light in a switched or switching manner onto a fiber optic array) and with coupling a first set of 3D projector heads and/or 3D projection devices to the fiber optic array via distribution optic fibers.

The method 900 continues at 920 with generating a set of 2D routing patterns for the fiber optic array and its particular connection locations. The 2D routing patterns typically will define which of a plurality of fiber connection locations on the array will receive light and at which intensity/power (the splitting ratio desired which may provide equal or unequal division of the high power illumination) and at which operating time period for each projector (e.g., which will receive left eye light at which time period and which will receive right eye light at that same time to avoid wasting light). At 930, the method 900 continues with transforming the 2D routing patterns into routing diffraction patterns or 2D holograms, and these are typically stored in memory or data storage that is accessible by a controller of the SLM that is used to display the holograms according to a predefined display algorithm (which holograms to display, when to switch between the holograms, and so on).

The method 900 then proceeds with step 935 involving determining whether high power illumination distribution in a switched manner for 3D projection should be initiated. If not, the method 900 continues with repeating step 935. If yes initiation is scheduled to begin or has been initiated, the method 900 continues at 940 with retrieving two or more of the routing diffraction patterns from memory. At 950, the method 900 includes displaying a next one of the routing diffraction patterns on two holographic display elements (e.g., SLMs or other devices useful for displaying holograms) with one directing left eye light to projectors displaying left eye content and with one directing right eye light to projectors displaying right eye content at a first time or operating state of a 3D projection system. At 960, the method 900 includes directing laser-provided left eye and right eye illumination or light onto or through the two concurrently displayed diffraction patterns. This causes the illumination or light from the left and right eye sources to each be split in equal or unequal ratios into one, two, or more beams and directed onto one, two, or more connection locations of a fiber optic array for distribution via optic fibers to one, two, or more projector heads. In this regard, the method 900 then continues at 970 with projecting 3D imagery (right or left eye images) with two or more projector heads (or other light-output devices) into two or more projection spaces.

The method 900 continues at 975 with determining (such as with a controller running a distribution control program) whether it is time to switch to a new 2D routing pattern for each of the two display elements/SLMs (e.g., to switch one from left eye light distribution to right eye light distribution and to switch the other one from right eye light distribution to left eye light distribution), and/or this may be time synchronized based on a left eye-right eye switching rate for a particular 3D projector. If not, the present pattern is displayed on the holographic display element and step 975 is repeated (which may be the case when the switch is "parked" as described above). If yes it is time to perform switching, the method 900 continues at 950 with displaying the next routing diffraction pattern (e.g., the routing diffraction pattern associated with the other eye content/source) on the holographic display element.

At some point in time, it may be desirable to reconfigure the distribution system such as to change the splitting ratios or to add or move a projector head. To this end, the method 900 may include step 980 that involves determining whether to modify the distribution system such as by changing/inserting distribution fibers on the fiber optic array to distribute light in a different manner (e.g., to new projectors or move projectors). If no, the method 900 continues at 975. If yes, the method 900 continues at 920 with generation of additional 2D routing patterns (e.g., to direct light to connection locations where distribution fibers for new projector heads have been coupled) and at 930 with generating new diffraction patterns or 2D routing holograms from the new 2D routing patterns. The method 900 may end at 990 after or during any of the steps 920-980.

Calculating the holographic diffraction pattern may involve performing the Fourier Transform of the desired intensity pattern of multiple beams (e.g., the 2D routing or distribution pattern). The intensity of the distribution pattern may be defined using grayscale to set the different amounts of light to be sent to different output fibers in a particular fiber optic array (and to coupled projector heads). Although some common SLMs are binary, binary holograms are capable of producing grayscale images. The SLM may be rapidly updated. Therefore, the hologram and 2D routing pattern may be dynamic and rapidly updated or changed. This enables features such as "plug-and-play," reconfigurable illumination networks (for directing illumination only to occupied theaters and ride areas and the like) and time multiplexed illumination (as in time multiplexed color, polarization, and/or blanking).

Holograms displayed as a 1D or 2D intensity or phase distribution on a flat SLM have two or more (conjugate) copies of the holographic image produced symmetrically positioned around a central undiffracted beam. Since the illumination beams do not carry image information other than a general illumination level, these copies may be separately collected by fibers and directed to different projector heads. Alternatively, the light from the multiple images may be sent to separate wavelength converters (e.g., IR to visible color). This would be especially convenient if using six primary colors since the image copies come in pairs. Yet another alternative is to use a fixed fiber combiner and combine the two copies into a single beam.

The central undiffracted beam may contain 20 to 85 percent of the illumination depending upon the type of SLM used and hologram type (binary/grayscale quantization, amplitude/phase modulation, square/sinusoidal profile, and so on). Any central undiffracted beam may be sent to another illumination distribution assembly or may be recirculated back into the same distribution assembly and/or input optical fiber. If a fiber laser is used as the laser light source, the fiber is the resonating cavity usually with etched Bragg gratings at the fiber ends acting as the cavity mirrors. With the illumination distribution assembly in the fiber's path, the undiffracted beam can be reflected back into the fiber and lasing medium by the SLM or be sent to another fiber that is used as a pump beam for the original or a separate fiber laser or doped fiber amplifier.

Unlike holograms with sinusoidal or square modulation profiles, blazed gratings are known to produce very efficient (e.g., greater than 85 percent) single diffraction orders (without a conjugate copy) with no central undiffracted beam. For all holograms, the pitch of the grating determines the angle of diffraction. However, instead of sinusoidal or binary phase profiles, the blazed grating has a sawtooth phase profile that directs most of the energy into a single diffraction order. Using a phase-only LCOS SLM (for example) as holographic display element, non-mechanical, high-diffraction efficiency, single spot scanning is possible by varying the pitch and/or blaze angle of the sawtooth phase grating. For the high-power illumination distribution assembly, multiple spots with controllable intensity should be controlled. This can be achieved by using superimposed blazed gratings of different pitches and/or blaze angles (to achieve multiple spots) and amplitude/phase modulation (to achieve different spot intensities), and computed in a similar manner to a diffraction specific holographic rendering algorithm.

Stated differently, it may be useful to provide a high power illumination system that is more efficient in its use of the light from the laser farm or laser source(s). In reflecting or refracting the laser light with a hologram, some amount of light can be lost such as due to loss of diffractive pairs (e.g., copies of the light to provide a +1 diffractive order that is delivered as desired to the array, a −1 diffractive order that may be lost, and a 0 order (reflection) that may also be lost). As shown in the figures, a blazed grating hologram can be used to eliminate multiple higher diffractive orders and conjugate pair, with only one order of diffracted light being produced with such a hologram it is possible to achieve high efficiencies such as up to 90 percent in many cases, even with quantized modulation levels.

In other cases, though, it may be useful to try to capture the −1 diffractive order and 0 order reflection. For example, these can be provided at connection locations of a fiber optic array for use as input to a projector. The −1 diffractive order may also be sent to color and/or a combiner (e.g., fiber coupler). In other cases, angle modulation can be used that is so "extreme" that all light in the −1 diffraction order and higher order reflection basically disappears. The zero order light may also be reflected with a mirror back into the source, e.g., back into a fiber laser. In other cases, the zero order light may also be captured, e.g., with a fiber(s), and returned to an inlet of a laser source, e.g., to an inlet of a fiber laser acting as a pump laser.

Although the invention has been described and illustrated with a certain degree of particularity, it is understood that the present disclosure has been made only by way of example, and that numerous changes in the combination and arrangement of parts can be resorted to by those skilled in the art without departing from the spirit and scope of the invention, as hereinafter claimed.

As will be appreciated from the above description, 3D projection using 6-P laser light as a light source is useful for producing an excellent 3D projection or display product. However, prior to the techniques described herein, it required the use of two projectors for each image to be displayed, with one for the right eye and one for the left eye of the viewer wearing 3D glasses. There was no solution that provided single projection 3D using 6-P technology. This limitation concerning the use of 6-P light (or other WMV technologies) is addressed herein with an optical light switch (or router), which allows the light from a bank of laser illuminators for either the right eye or the left eye to be sequentially routed to a single projector. This allows the projector to synchronize media playback with the correct light source so that only one projector needs to be used to project 3D in a space (e.g., a theater or the like) rather than two projectors.

At any given time with prior projection systems, the expensive laser light sources were only being used 50 percent of the time, which was a great waste of expensive light. In contrast, the switch/router is configured to allow the light not currently being used by a projector to be routed to a second projector in use either in the same space/scene or in a nearby space (e.g., another nearby portion of a park ride using 3D effects) so that this second projector is concurrently making use of the light from the single 3D light source. This allows two projectors to share the light sources, with each of the projectors using each of the right and left eye sources fifty percent of the time to create 3D images and with no light from the sources being wasted. The use of the multi-theater light source with its switch/router can cut the number of projectors and custom lenses need for an park attraction or other setting in half and allow for configurations and applications where installing two projectors per raster is not practical.

Multiple methods of routing the light from the left and right eye sources may be utilized to implement the multi-theater light source. Note, light switches/routers that work well at lower power levels may or may not be useful and/or feasible for the higher power level illumination provided by the shared right and left eye light sources (lasers, fiber lasers, laser banks, and the like) to be used in the projection systems taught herein. Likely methods for use in implementing the switch/router include spinning mirrors or polygons, DMDs, fiber-optical switches, holographic distribution, polarization, LCOS, dichroic filters with collectors, and the like.

One important concept taught therein for the multi-theater light source and its use in 3D projection systems is first temporally controlling the light from two sources so that a single projector can be used to display 3D content. Another important concept is routing the waste light to a second projector. An additional unique feature of the light source of the present description is the feature of being able to park the switch/router to allow full time routing of light when needed from each source directly to one projector with no loss during the dark interval, and this allows the projectors to operate at higher efficiency when only 2D projection is required.

In general, acceptable cross-talk between images is typically below 5 to 10 percent. To minimize the time a frame is illuminated with both primary color sets during switching, the switching time between configurations preferably is relative short. For example, the switching time may be maintained below 1.67 ms (including signal response time) so that the switch (e.g., switch 400 in FIG. 4) remains stable in each state (e.g., 95 percent of the time or the like) when switched at a rate of 120 Hz (e.g., 7.9 ms at 120 Hz, 0.41 ms rise time). Longer switching times are feasible if the illumination of the lasers can be turned off or dumped to create a blanking period while the switch occurs.

At this point in the description, it may be useful to provide other switching techniques and mechanisms that can be used to implement the present invention. One example switching technique involves diffractive, polarization, and interferometric approaches to high power illumination switching for efficient 6P color sharing. Specifically, rapid switching between the cross and bar states can also be achieved using diffraction, polarization, or interferometric approaches. Many described approaches are non-mechanical (or micro-mechanical) avoiding wear and inertial effects allowing for faster switching. Some approaches allow all-fiber switching, avoiding the insertion losses associated with out and n-coupling using free-space optical switching between fiber optics. In general, acceptable cross-talk between images is typically below 2 to 5 percent. To minimize the time a frame is illuminated with both primary color sets during switching, the switching time between configurations preferably is relatively short. For example, the switching time may be maintained below 0.417 ms (including signal response time) so that the switch (e.g., switch 400 in FIG. 4) remains stable in each state (e.g., 95 percent of the time or the like) when switched at a rate of 120 Hz (e.g., 7.92 ms at 120 Hz, 0.418 ms rise time). Longer switching times are feasible if the illumination of the lasers can be turned off or dumped to create a blanking period while the switch occurs (such that cross-talk is less than 2 to 5 percent).

In other cases, switching may be achieved via a reflective SLM (e.g., a mirror array) and a diffractive/hologram-based switching. With diffractive switching, for each fiber in a fiber pair carrying corresponding primary components (e.g. R1/R2, or G1/G2, or B1/B2), light exits the fiber and is collimated by a lens (L1,L2) and impinges on a reflective spatial light modulator (SLM) (e.g. a digital micro-mirror device (DMD)). The SLM presents a diffraction grating corresponding to one of several deflected states. A coarse pitch grating deflects light less than a fine pitch grating. The deflection angle determines which output fiber the light from the input fiber is routed to. The deflected collimated light from both SLMs (or both halves of a single SLM) are focused by the same objective lens (L3) into the fiber related to the angle of deflection.

Figure 10:
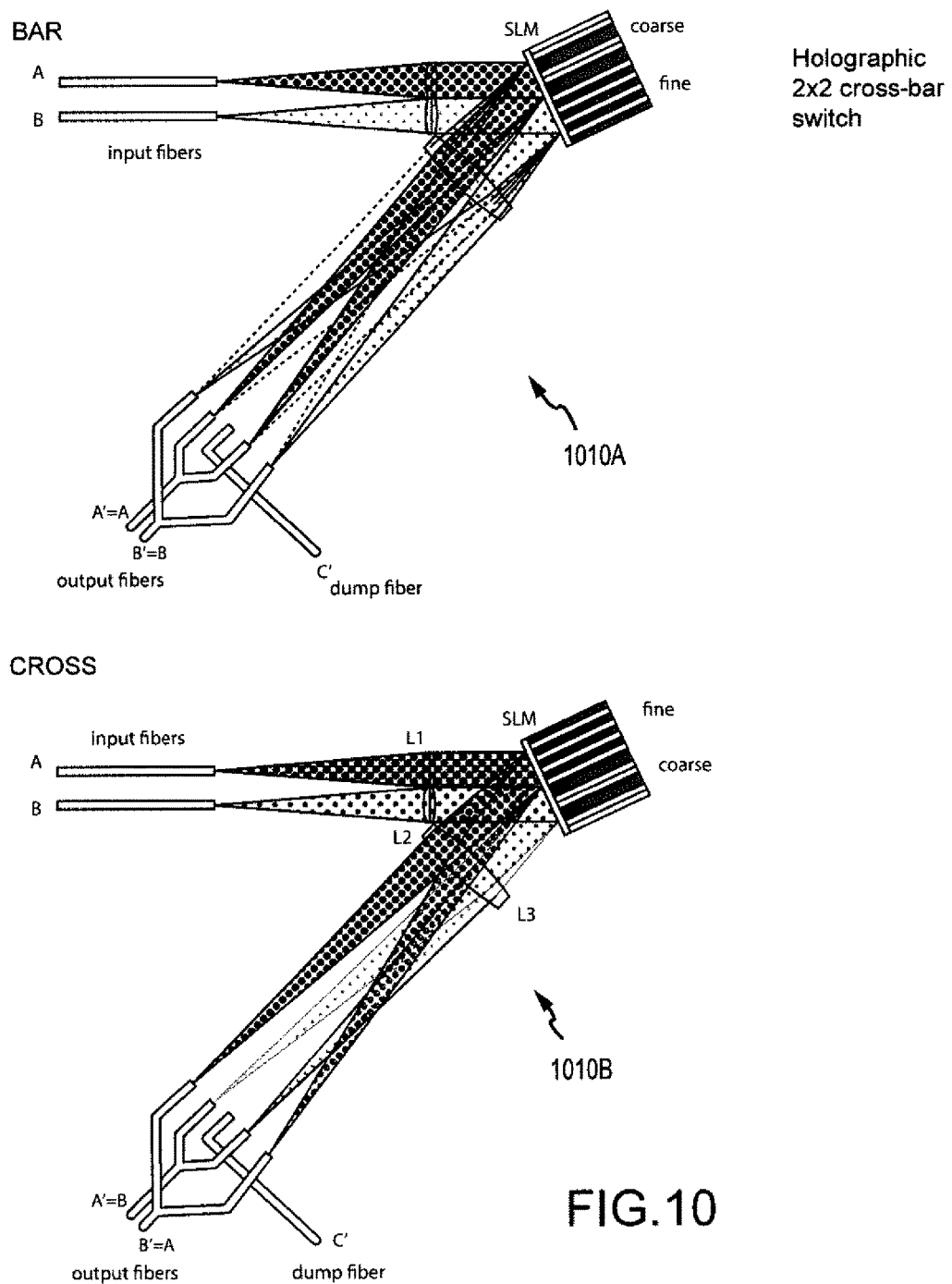
FIG. 10 illustrates an SLM-based, fiber optic switch in its bar and cross states.
Figure 11:
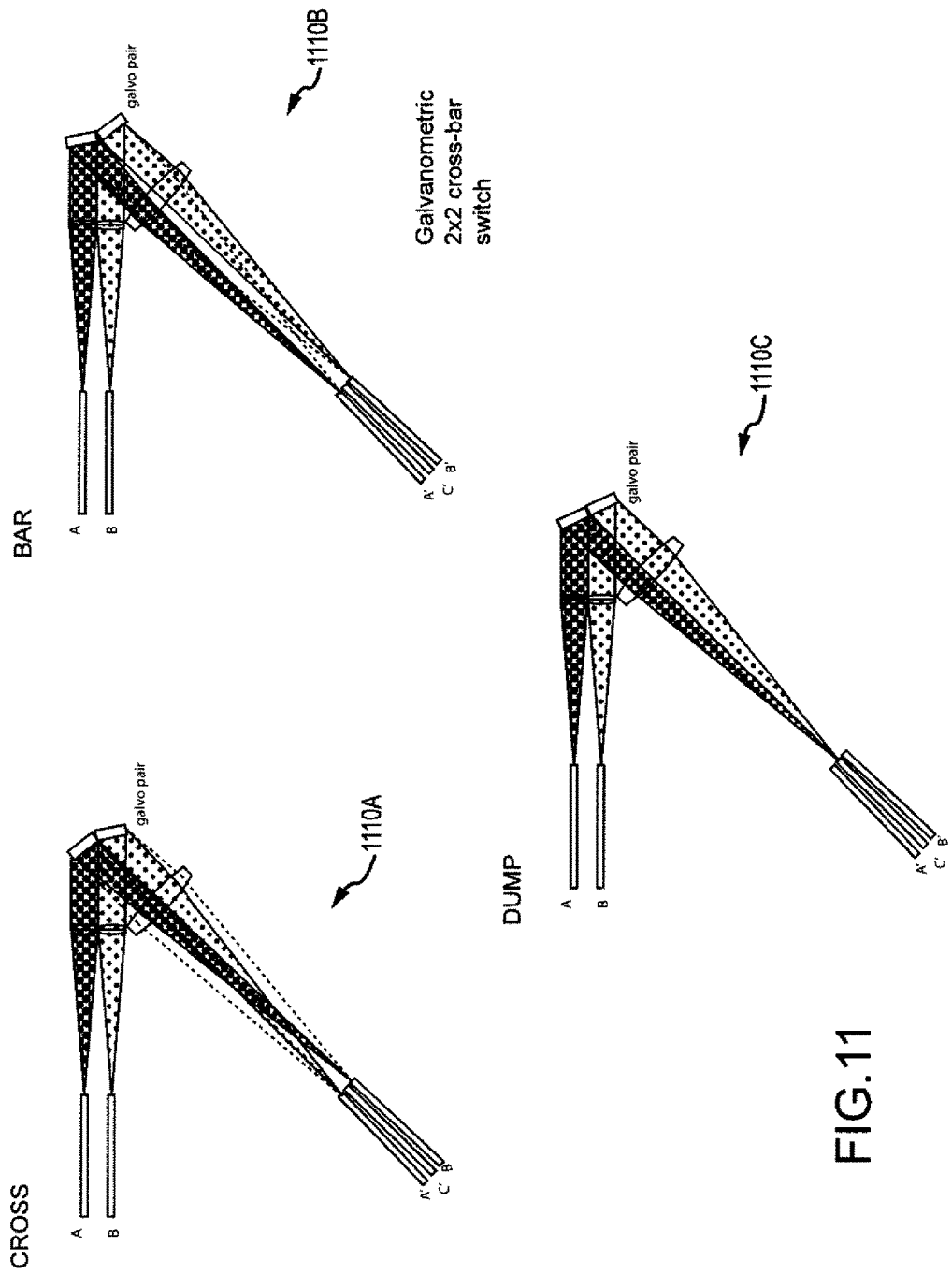
FIG. 11 illustrates a scanning-type switch in its cross, bar, and dump operating states or modes.
Figure 12:
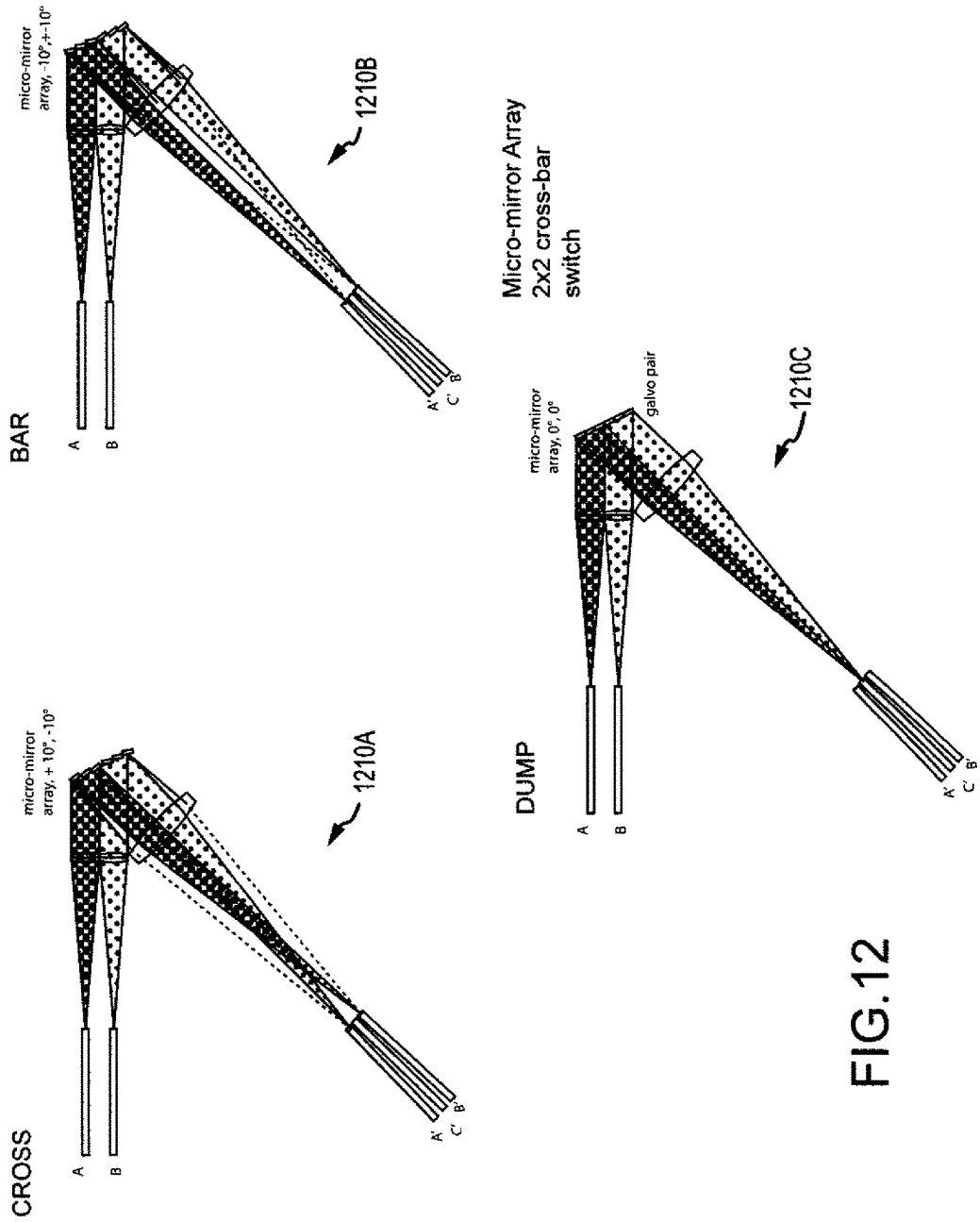
FIG. 12 illustrates a switch in its cross, bar, and dump states/modes that is configured to utilize binary micro-mirror array deflection.

The objective lens' (L3) aperture accepts side-by-side collimated light from both SLMs, so L3's aperture is at least twice as large as the collimating lenses L1, L2. Light from input fiber A will enter the left-side of objective lens, be deflected and focused by the objective lens L3, and enter either fiber A' or B' on the left half of the input cone (for either deflection). Similarly, light from input fiber B will enter the right-side of objective lens, be deflected and focused by the objective lens L3, and enter either fiber A' or B' on the right half of the fiber's acceptance cone (for either deflection). This switching is shown in FIG. 10 with an SLM-based switch in a bar and a cross state at 1010A and 1010B, respectively.

For light efficiency, all the light from the input fibers should be routed to one or the other output fiber. The numerical aperture (NA) is a dimensionless number that describes the range of angles a lens or fiber can accept light. A related dimensionless number describing the light collection ability of lenses is the f/#, which is the focal length of a lens divided by its aperture diameter. For light efficiency, the NA aperture (or f/#'s) of different components in the system should be matched.

The light from the input fibers (A,B) is captured and collimated by the corresponding collimating lenses (L1, L2). To do so, the lenses' numerical apertures (NA) should match (or equivalently the f/#) the NA of the fibers. Similarly, the objective lens (L3) should take all the deflected light from either input fiber (and their collimating lenses) and focus them all within the acceptance angle of the output fibers (A',B'), so all the light is guided in the output fiber. If the input and output fibers have similar numerical apertures, then the objective lens L3 should have a focal length about twice that of the collimating lenses L1, L2. The objective lens L3 is accepting the side-by-side deflected collimated light from the collimating lenses (L1, L2), so the diameter of objective lens L3 must be at least twice that of each collimating lens (L1 or L2). To maintain the same f/# (focal length divided by diameter) in the system, the focal length should also be doubled.

Multiple deflection angles (with corresponding diffraction gratings) can be used, each directing an input fiber's light to a different output fiber. For instance, instead of just a cross-bar arrangement for switching between two projectors, a third state (perhaps when SLM unpowered and/or undeflected) which directs the light into a beam-dump may be useful as a safety measure or to provide blanking. The f/# of the collimating lens L3 can be adjusted (by adjusting the focal length and diameter) to accept all the deflected light from the SLM and to focus them all within the acceptance angle of the output fibers.

In some embodiments, the switch utilizes two white input fibers, two SLMs, opposite dispersion lens, and two output fibers. The input fibers could each be carrying three wavelengths of one color component set (R1G1B1 and R2G2B2). Their light would each be deflected by a different amount based on the wavelength dependent diffraction equation. To counter the wavelength dependence of the diffraction deflection, an objective lens with the opposite dispersion characteristics of the diffraction grating is used to recombine the color components at the focus into the desired output fiber.

In other cases, the switch is configured based on zero and higher orders techniques. Diffraction often occurs with undeflected zero-order beams as well as higher diffraction orders (equal but opposite diffraction deflection angles). The zero-order could be collected by a separate fiber and sent to a beam-dump or recycled in as a seed feed into the fiber laser or could be avoided using blazed gratings from a multilevel SLM or a carefully oriented SLM such that its reflection angle and first order diffraction angle from the gratings are the same. Multiple fibers can collect the focused light from opposite deflection angles, then be sent to separate projectors requiring the same color component light; recombined into a single fine using a 1×2 coupler; or optically in a similar manner presented here for inputting light from multiple sources into a single fiber, of collimating each beam with its own collimating lens, impinging side-by-side onto a common objective lens and focusing into a single fiber. Higher orders may also be avoided by tilting the SLM so higher and unwanted orders are evanescent and, therefore, do not appear.

As shown with a scanner-based switch in cross, bar, and dump states 1110A, 1110B, and 1110C, respectively, alternatively, non-diffractive scanning can also be used with this optical arrangement allowing for wavelength independent routing (and without potential diffractive orders). For each fiber in a fiber pair carrying corresponding primary components (e.g. R1,R2, or G1,G2, or B1,B2), light exits the fiber, is collimated by a lens (L1,L2), and impinges on a reflective scanner (e.g. galvanometric mirror scanner:galvo). The deflected collimated light from both SLMs (or both halves of a single SLM) are focused by the same objective lens (L3) into the fiber related to the angle of deflection. The defection determines which output fiber the light from the input fiber is routed to. The objective lens' (L3) aperture accepts side-by-side collimated light from both SLMs. Light from input fiber A will enter the left-side of objective lens, be deflected and focused by the objective lens L3, and enter either fiber A' or B' (depending upon the deflection angle) on the left half of the input cone (for either deflection). Similarly, light from input fiber B will enter the right-side of objective lens, be deflected and focused by the objective lens L3, and enter either fiber A' or B' on the right half of the input cone (for either deflection). The scanner would rapidly deflect the beams to their desired output fibers, then dwell until the next switching time. There is also opportunity to direct the beams to a third beam-dump fiber, C', for safety or blanking purposes.

In other switching devices, switching is provided using binary micro-mirror array deflection. The same optical arrangement (as discussed above) may be used with the DMD SLM acting as a reflective deflector array rather than a diffractive scanner as shown such a switch in its cross, bar, and dump operating states or modes at 1210A, 1210B, and 1210C. In normal operation, the DMD has binary states (±10 deg deflection). In this case, the deflection is not wavelength dependent and white light may be routed to the desired fibers. The use of a micro-mechanical scanner array avoids the inertia and other limitations of larger galvo-mirror based scanning for this case.

Switching may be based upon polarization. For example, fiber lasers of less than 1 kW power output are capable of producing stable linearly polarized light. This provides the opportunity to use polarization controllers and polarization selective mirrors as a means for rapid cross-bar switching between pairs of fibers.

Figure 13:
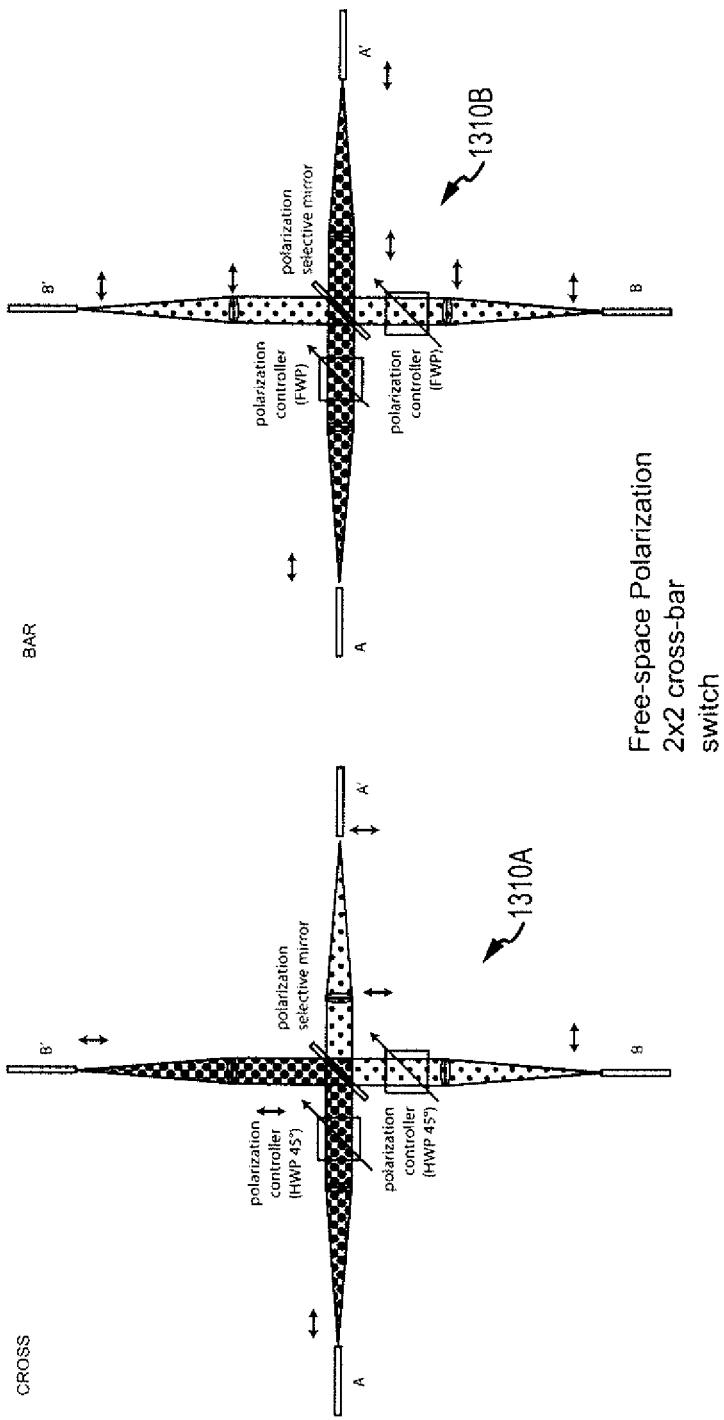
FIG. 13 illustrates a switch using polarization-based switching in its cross and bar operating states.

In a more specific implementation or example, switching may use polarization via free-space optics. A pair of input fibers are placed 90° apart from each other. A pair of output fibers are placed opposite and facing the input fibers. A polarization selective mirror is placed at the intersection of the straight-line paths between the input and output fibers and is oriented at a 45° angle such that the optical axes of the input fibers could reflect off the mirror and be aligned with the optical axes of the output fibers. Collimating lenses (L1, L2) are placed between the input fibers and the polarization selective mirror. Objective lenses (L3, L4) are placed between the polarization selective mirror and output fibers. Polarization controllers may be placed between the collimating lenses and the polarization selective mirror, or before the input fibers. Such a switch is shown in its cross and bar operating states/modes at 1310A and 1310B in FIG. 13.

With polarization-based switching, for each fiber in a fiber pair carrying corresponding primary components (e.g. R/r, or G/g, or B/b), polarized light (e.g. horizontally polarized light) exits the fiber, is collimated by a lens (L1, L2), and passes through a polarization controller. The polarization controller (e.g., a Pockels cell) may pass the polarized light unaffected (remaining horizontally polarized light) or rotate the polarization 90° so it becomes orthogonally polarized (e.g., vertically polarized light) based upon an input voltage signal. The polarized collimated light beams impinge on the polarization selective mirror (e.g., a wire-grid polarizer) and either passes or reflects off the polarization selective mirror depending upon the lights polarization.

For the bar state for example, if light from the input fibers are horizontally polarized (A↔□, B↔□) and collimated by their corresponding lenses (L1, L2), and the polarization controllers are set to not rotate the polarization (A↔□, B↔□). Then, both light beams pass through the polarization selective mirror and are focused to the output fibers opposite of the input fibers (A→A'), (B→B'). For the cross state for example, if light from the input fibers are horizontally polarized (A↔□, B↔□) and collimated by their corresponding lenses (L1, L2), and the polarization controllers are set to rotate the polarization (A↕□,B↕□). Then, both light beams are reflected off the polarization selective mirror and are focused to the output fibers 90° to the input fibers (A→B'), (B→A').

Figure 14:
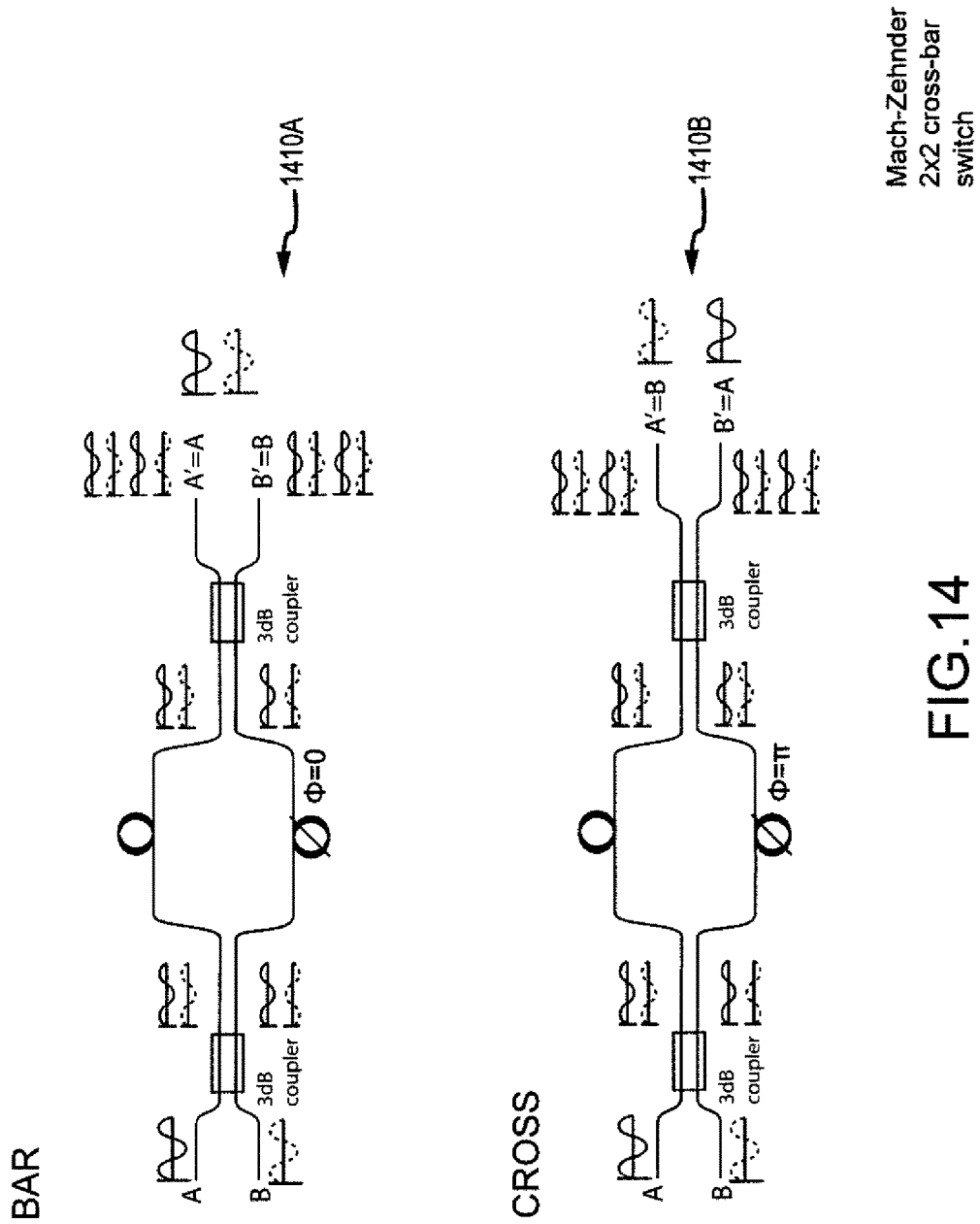
FIG. 14 illustrates another switch using polarization based switching (e.g., a Mach-Zehnder 2×2 cross-bar switch) in its bar and cross operating states.

An all-fiber polarization-based cross-bar switching can be similarly achieved using in-fiber polarization controllers and polarization splitters/combiners, for low-loss, compact, and rapid switching. The input fiber carrying one primary component set (e.g. R,G, B) is polarized in one orientation (e.g., horizontally polarized light) while the other input fiber carries the complementary primary component set (e.g. r,g,b) and is polarized in the orthogonal orientation (e.g., vertically polarized light). The polarization controller (e.g. piezo-squeezers using stress birefringence) may pass the polarized light unaffected (acting as a null or full-wave retarder) or rotate the polarization 90° (acting as a half-wave plate at 45°) so the light in the fiber becomes orthogonally polarized (e.g., horizontally polarized light becomes vertically polarized, and visa-versa) based upon an input voltage signal. A polarization splitter routes one polarized primary component set to one output fiber and the orthogonally polarized component set to the other output fiber. Either an achromatic or broadband polarization controller is used (to ensure the appropriate polarization rotation for each of the primary component wavelengths). In other cases, a wavelength splitter can be used to separate the individual color components (or color-pairs, e.g. R/r; G/g, B/b) into separate fibers to appropriately and accurately rotate the polarization for each component, then recombine the components using a wavelength combiner, before using a polarization splitter to route the polarized light components to their desired output fibers. A switch implementing this approach is shown in its bar and cross states at 1410A and 1410B in FIG. 14.

For the bar state for example, if light from the r, g, b input fiber is horizontally polarized (A↔□), while light in the R,G,B input fiber is vertically polarized (By), then both light paths are combined using a polarization combiner. The light passes through the polarization controller without changing polarization states (rgb_↔□, RGB_↕□) and is split with a polarization splitter with the horizontally polarized light (rgb_↔□) routed to one output fiber (A'h), and the vertically polarized light (RGB_↔□) routed to the other output fiber (B'↕□).

For the cross state for example, if light from the r,g,b input fiber are horizontally polarized (A↔□), while light in the R,G,B input fiber is vertically polarized (B↕□), then both light paths are combined using a polarization combiner. The light passes through the polarization controller rotating the polarization states 90° (rgb_↕□, RGB_↔□) and is split with a polarization splitter with the horizontally polarized light (RGB_↔□) routed to one output fiber (A'↔□) and the vertically polarized light (RGB_↕□) routed to the other output fiber (B'↕□).

A switch may also be configured to exploit interferometry to create an in-fiber illumination switch. An in-fiber illumination switch avoids the coupling losses and size associated with free-space illuminations switches. A fiber Mach-Zehnder interferometer includes two input fibers both connected to a 50/50 fiber splitter that combines the light from each input fiber and splits them into two branches. For each fiber input's light, the 50/50 fiber splitter splits the light between the one branches with equal power but 180° out of phase with each other. One branch (e.g., the lower branch) has a coiled fiber wrapped around a piezotube, the other branch also has a coiled fiber to length match the two branches. When a voltage is applied to the piezotube, it expands radially stretching the optical fiber wrapped around it and introducing a delay or phase shift in the light in the upper branch. The use of a piezotube and coiled fiber allow rapid phase shifts (and hence switching).

Then the two branches enter another 50/50 fiber splitter that combines the light from each branch and splits them into two output fibers. Again, the 50/50 fiber splitter combines the light in one branch (e.g. the upper-branch) in-phase. In the other branch (e.g., the lower-branch), the light is combined out of phase. At each output fiber, the light from each input fiber has traveled both branches, recombined and constructively/destructively interfere. By controlling the voltage on the piezotube and the resulting phase difference between the upper and lower branches, a controllable ratio of the two input ports' light can be sent to the output ports (with the two output ports ratios being complementary; example 80:20 on one port and 20:80 on the other). For a binary cross-bar switch, the phase delay is either 0 or 180 degrees. At each output port, the two copies of light from one input port completely constructively interferes (appearing at that output fiber), while the two copies from the complementary input port completely destructively interferes (and does not appear at that output fiber). In this case, there is no interference between the light from the different input ports, since the light from each port either completely constructively or destructively interferes with copies of itself.

For the bar state, after light from the two input fibers (A and B) pass through the 50/50 fiber splitter, the upper branch has an in-phase combination of A and B; and the lower branch has an out-of-phase combination. After the coiled sections and without additional phase delay from the piezo tube, the upper branch still is still in-phase and the lower branch out-of-phase. After the 50/50 fiber splitter, the upper output port (A') is an in-phase combination of the upper and lower branches. In the upper port's output (A'), the copies of the light from input fiber A constructively interfere, while the copies of the light from input fiber B destructively interfere, resulting in only light from input fiber A at output fiber A'. Similarly, at the lower output port (B') is an out-of-phase combination of the upper and lower branches In the lower port's output (B'), the copies of the light from input fiber A destructively interfere, while the copies of the light from input fiber B constructively interfere, resulting in only light from input fiber B at output fiber B'. For this fiber switch in the bar state, A→A' and B→B'.

For the cross state, after light from the two input fibers (A and B) pass through the 50/50 fiber splitter, the upper branch has an in-phase combination of A and B. The lower branch has an out-of-phase combination. After the coiled sections and with an additional 180 degree phase delay in the lower branch from the piezo tube, the upper branch is still an in-phase combination of A and B, while the lower branch still is an out-of-phase combination of A and B but with inverted amplitudes. In the upper port's output (A'), the copies of the light from input fiber A destructively interfere, while the copies of the light from input fiber B constructively interfere, resulting in only light from input fiber B at output fiber A'. Similarly, at the lower output port (B') is an out-of-phase combination of the upper and lower branches In the lower port's output (B'), the copies of the light from input fiber A constructively interfere, while the copies of the light from input fiber B destructively interfere, resulting in only light from input fiber A at output fiber B'. For this fiber switch in the cross state, A→B' and B→A'.

The complete self-constructive or self-destructive interference depends upon the 180 degree ($\pi$ rad) phases shifts at the fiber combiners and the phase delay (coiled fiber wrapped around piezotube). There are often wavelength dependencies in amplitude and phase of beam combiners and phase shifters. These dependencies are controlled for proper operation of this switch for use with multiple wavelength (color).

Figure 15:
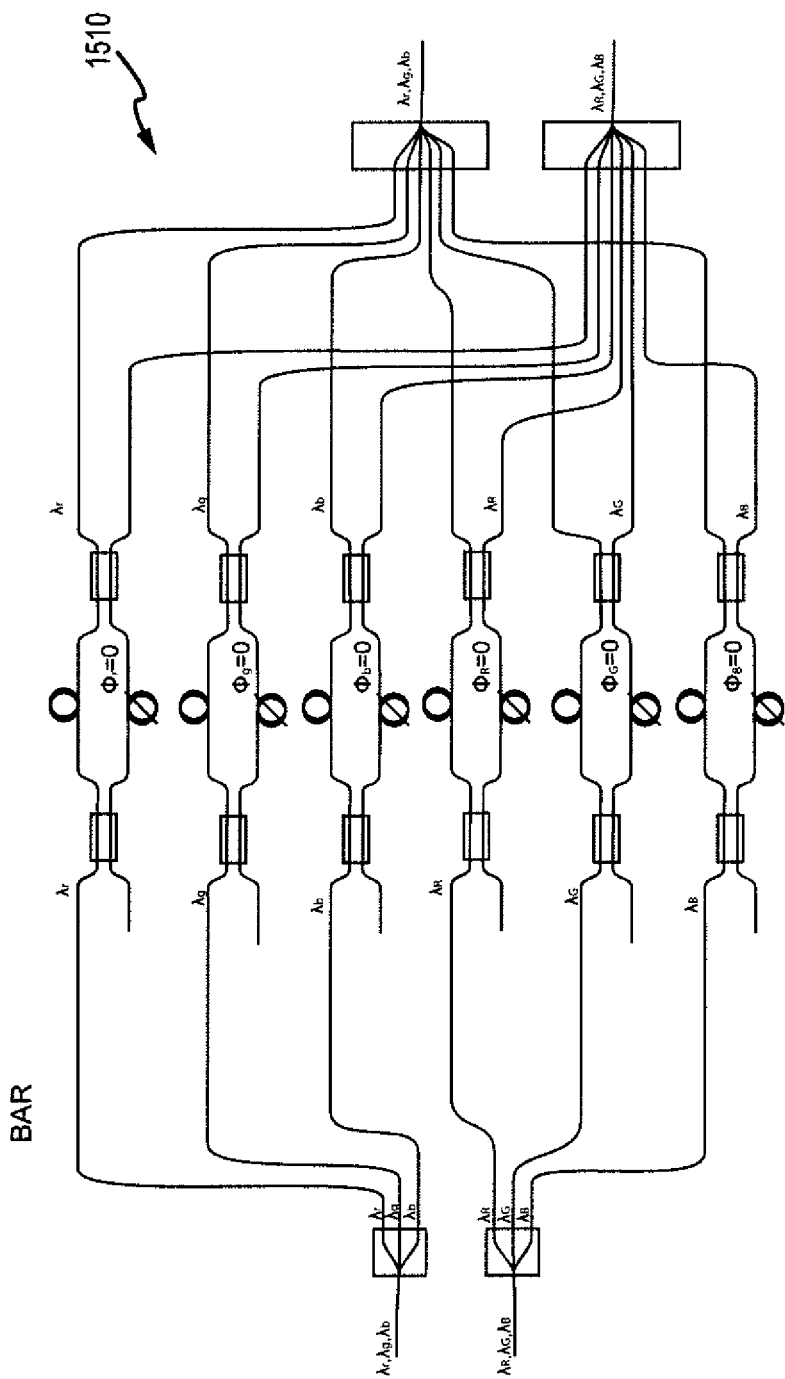
FIG. 15 illustrates a multi-system, multi-wavelength interferometric 2×2 cross-bar switch in its bar state.

Interferometric-type switching may be implemented with multiple wavelength systems. One option is to use a wavelength dependent splitter to split the input fibers' light into its six different color components and to use six different switches (with one interferometer per color component and with one port of each switch empty). The upper output ports of each switch are combined with a wavelength dependent combiner and sent to one projector, and similarly the lower output ports of each switch are combined with a wavelength dependent combiner and sent to the other projector. Such a switch 1510 is shown in tis bar mode in FIG. 15.

Figure 16:
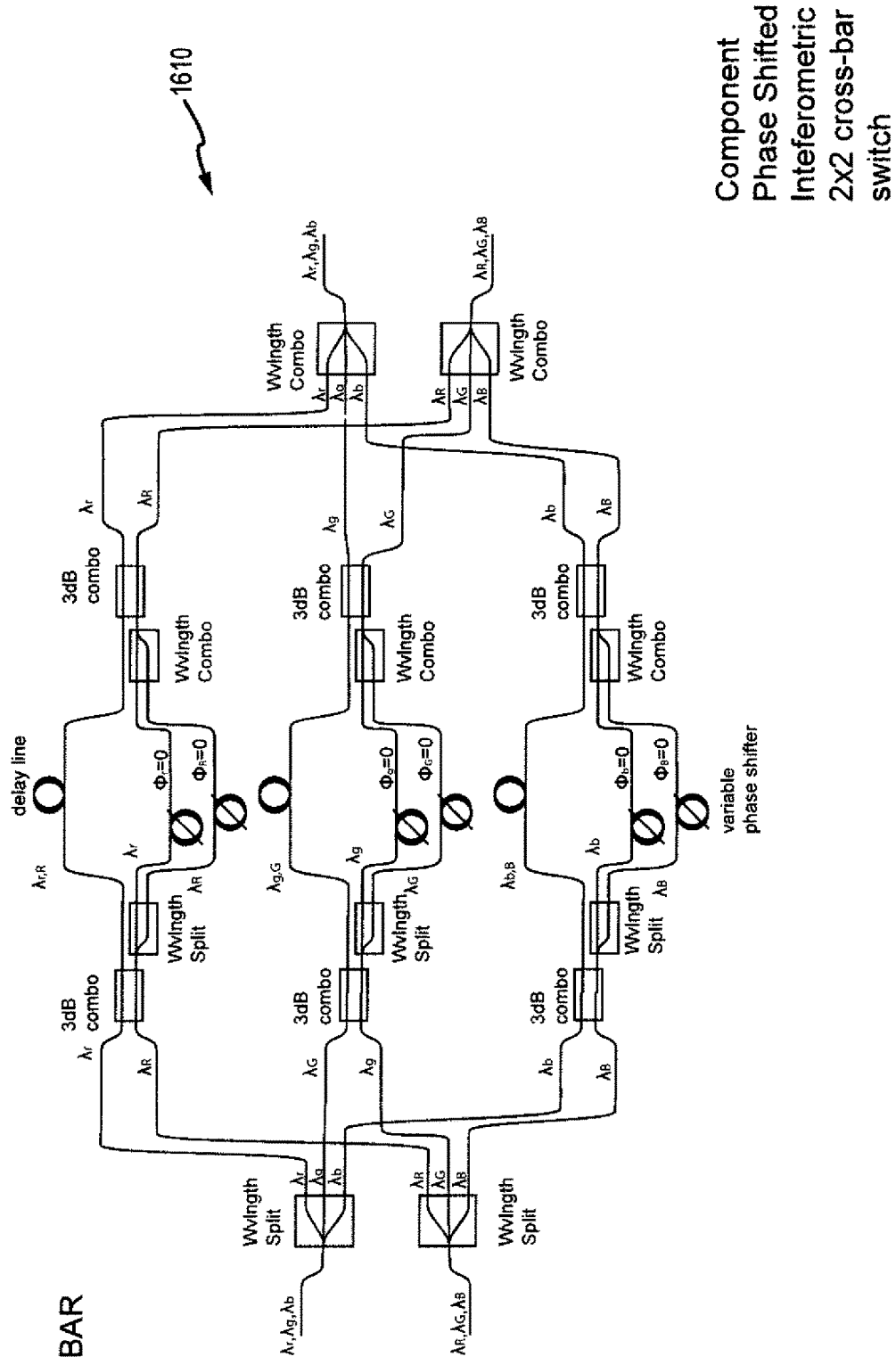
FIG. 16 illustrates a component phase-shifted interferometric 2×2 cross-bar switch in the bar state.
Figure 17:
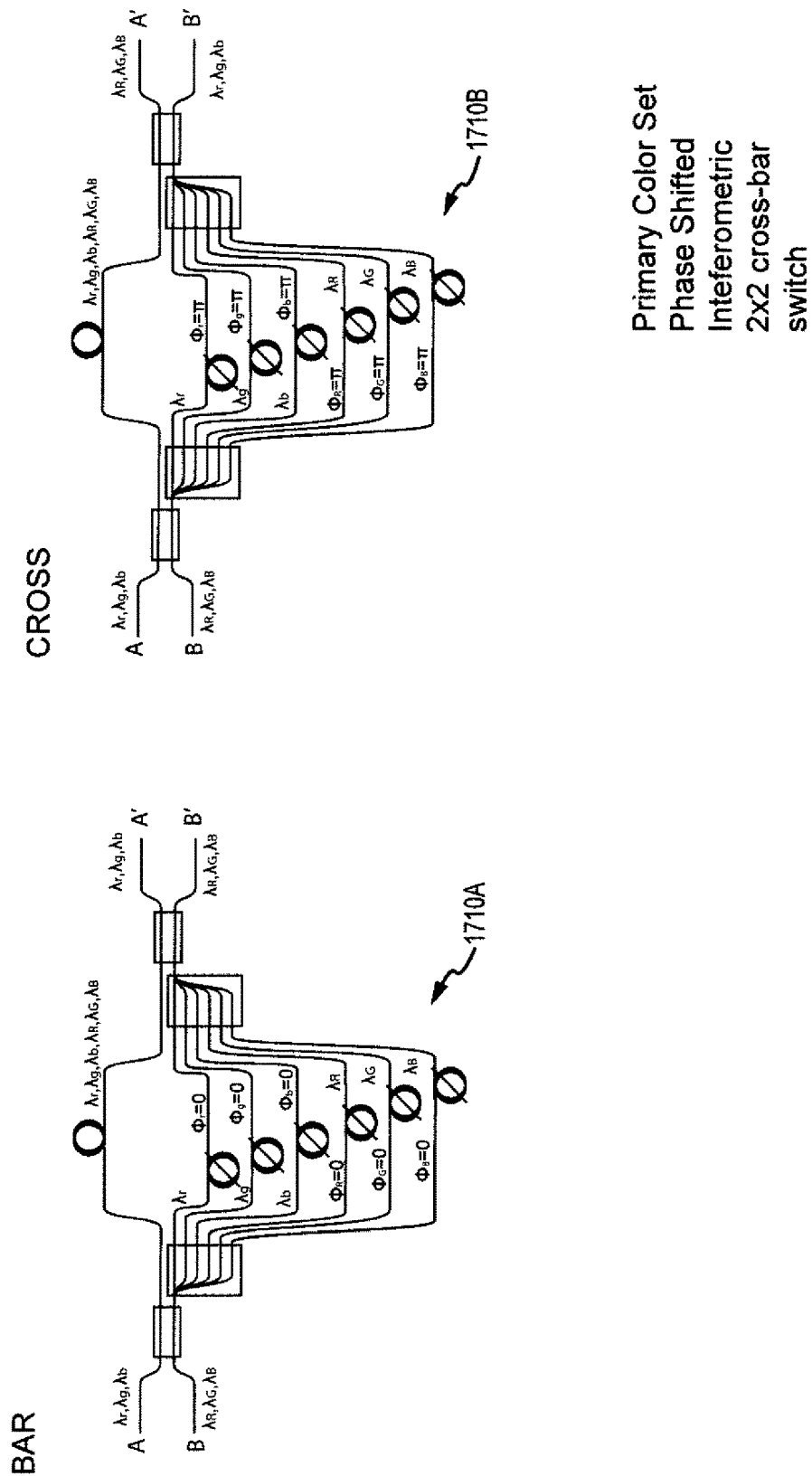
FIG. 17 illustrates a primary color set interferometric 2×2 cross-bar switch in the bar and cross states, respectively.

An interferometric switch may also be adapted to use multiple wavelengths, a broadband combiner, and multiple phase shifters. For example, another option is to use achromatic or broadband fiber combiners in the visible frequency range (400-700 nm) to ensure equal amplitude/power and 180 degree phase shifts for the splitting/combining. The phase delay, however, is achieved through changing the optical path length, so light of different wavelengths will experience different phase delays for the same optical path length change. A wavelength dependent splitter can be used to split the different wavelengths of light in the lower branch after the broadband fiber combiner, with each wavelength split having its own phase shifter whose optical path length change is appropriate for that split's wavelength to achieve the 180 degree phase shift in that path. The input to the interferometer may be pairs of color components (R/r,G/g, Bb) (see switch 1610 in FIG. 16 in the bar state) or complete color sets (RGB,rgb) (see switch in FIG. 17 in the bar and cross states 1710A and 1710B, respectively).

We claim:

1. An apparatus for use as a light source for two or more projectors positioned in different spaces and operable to project three dimensional (3D) imagery, comprising:
a first light source outputting light configured for use by the projectors to display left eye content associated with the 3D imagery;
a second light source outputting light, concurrently with the outputting of the light from the first light source, configured for use by the projectors to display right eye content associated with the 3D imagery; and
a switching device receiving the light output from the first light source and the light output from the second light sources and, in a first operating state, directing the light output from the first light source toward a first one of the projectors and the light output from the second light source toward a second one of the projectors and, in a second operating state, directing the light output from the first light source toward the second one of the projectors and the light output from the second light source toward the first one of the projectors.

2. The apparatus of claim 1, wherein the switching device switches between the first and second operating states at a frequency of at least 120 Hertz during operations of the apparatus.

3. The apparatus of claim 1, further comprising a controller generating control signals to the first one of the projectors and to the second one of the projectors to synchronize operations of the projectors to display left eye content when receiving the light output from the first light source and to display right eye content when receiving the light output from the second light source.

4. The apparatus of claim 3, wherein the controller generates a park control signal to the switching device to remain in the first or second operating state for a predefined time period, whereby the light output from the first light source or the second light source is directed to the projectors for the predefined time period.

5. The apparatus of claim 1, wherein the switching device comprises a spinning disk with a first segment mirrored on first and second sides and a second segment that is transparent or substantially transparent to light and wherein the spinning disk is oriented to, during the spinning, to alternate between having the first segment receiving the outputs of the first and second light sources in the first operating state and having the second segment receiving the outputs of the first and second light sources in the second operating state.

6. The apparatus of claim 1, wherein the switching device comprises a fiber-optical switch switchable between a bar state and a cross state, wherein the output light from the first light source is directed to a first output port with the fiber-optical switch in the bar state and is directed to a second output port with the fiber-optical switch in the cross state, and wherein the first output port is coupled to an input of the first one of the projectors and the second output port is coupled to an input of the second one of the projectors.

7. The apparatus of claim 1, wherein the switching device, in the first operating state, displays first and second holograms on first and second display elements, respectively, to route the output light from the first and second light sources and, in the second operating state, displays the second and first holograms on the first and second display elements, respectively to route the output light from the first and second light sources.

8. The apparatus of claim 7, wherein, in the first and second operating states, the switching device routes the output light from the first and second light sources to at least three of the projectors.

9. The apparatus of claim 8, wherein the first and second holograms are configured to provide unequal splitting of the output light from the first and second light sources, whereby at least one of the at least three projectors receives light of a differing intensity.

10. The apparatus of claim 1, wherein the first and second light sources are 6-P lasers or laser banks configured to provide $R_1G_1B_1$ and $R_2G_2B_2$ light.

11. A 3D projection system, comprising:
in a first space, a first projector switching between projecting left eye content and right eye content for a first 3D projected image;
in a second space, a second projector switching between projecting left eye content and right content for a second 3D projected image; and
a multi-theater light source comprising:
a first laser light source outputting left eye 3D light;
a second laser light source outputting right eye 3D light, concurrently with the outputting of the light from the first light source; and
a switching device switching between first and second operating states, wherein the switching device receives the left eye 3D light and the right eye 3D light from the first and second laser light sources, wherein, in the first operating state, the switching device routes the left eye 3D light from the first light source toward the first projector and the right eye 3D light from the second light source toward the second projector, and wherein, in the second operating state, the switching device routes the left eye 3D light from the first light source toward the second projector and the right eye 3D light from the second light source toward the first projector.

12. The system of claim 11, wherein the multi-theater light source further comprises a controller generating control signals to the first projector and to the second projector to synchronize operations to display the left eye content when receiving the left eye 3D light from the first light source and to display the right eye content when receiving the right eye 3D light from the second light source.

13. The system of claim 11 wherein the switching device comprises a spinning disk with a first segment mirrored on first and second sides and a second segment that is transparent or substantially transparent to light and wherein the spinning disk is oriented to, during the spinning, to alternate between having the first segment receiving the left and right eye 3D light of the first and second light sources in the first operating state and having the second segment receiving the left and right eye 3D light from the first and second light sources in the second operating state.

14. The system of claim 11, wherein the switching device comprises a fiber-optical switch switchable between a bar state and a cross state, wherein the left eye 3D light from the first light source is directed to a first output port with the fiber-optical switch in the bar state and is directed to a second output port with the fiber-optical switch in the cross state, and wherein the first output port is coupled to an input of the first projector and the second output port is coupled to an input of the second projector.

15. The system of claim 11, wherein the switching device, in the first operating state, displays first and second holograms on first and second display elements, respectively, to route the left and right eye 3D light from the first and second light sources and, in the second operating state, displays the second and first holograms on the first and second display elements, respectively to route the left and right eye 3D light from the first and second light sources.

16. The system of claim 15, wherein, in the first and second operating states, the switching device routes the left and right eye 3D light from the first and second light sources to at least three of the projectors.

17. The system of claim 16, wherein the first and second holograms are configured to provide unequal splitting of the left and right eye 3D light from the first and second light sources, whereby at least one of the at least three projectors receives light of a differing intensity.

18. An apparatus for use as a light source for first and second projectors positioned in different spaces and projecting 3D images, comprising:
a first laser light source generating first light;
a second laser light source generating second light, concurrently with the outputting of the light from the first light source, wherein the first and second laser light sources are run at 100% duty cycle; and
a switching device switching between first and second operating states, wherein the switching device, in the first operating state, routes the first light to a first output for use by the first projector to display left eye content for a first 3D image and the second light to a second output for use by the second projector to display right eye content for a second 3D image and wherein the switching device, in a second operating state, routes the first light to the second output for use by the second projector to display left eye content for the second 3D image and the second light to the first output for use by the first projector to display right eye content for the first 3D image.

19. The apparatus of claim 18, wherein the switching device comprises a spinning disk with a first segment mirrored on first and second sides and a second segment that is transparent or substantially transparent to light and wherein the spinning disk is oriented to, during the spinning, to alternate between having the first segment receiving both the first and second lights in the first operating state and having the second segment receiving both the first and second lights in the second operating state.

20. The apparatus of claim 18, wherein the switching device comprises a fiber-optical switch switchable between a bar state and a cross state, wherein the first light is directed to the first output with the fiber-optical switch in the bar state and is directed to the second output with the fiber-optical switch in the cross state, and wherein the first output is coupled to an input of the first projector and the second output is coupled to an input of the second projector.

21. The apparatus of claim 18, wherein the switching device, in the first operating state, displays first and second holograms on first and second display elements, respectively, to route the first and second lights and, in the second operating state, displays the second and first holograms on the first and second display elements, respectively, to route the first and second lights.

22. The apparatus of claim 18, wherein the switching device switches between the first and second operating states using one of diffraction, polarization, or interferometry.

23. The apparatus of claim 22, wherein the switching device uses diffraction-based switching and includes a reflective spatial light modulator (SLM) presenting a diffraction grating to provide the diffraction-based switching.

24. The apparatus of claim 22, wherein the switching device uses diffraction-based switching and the switching device is configured for binary micro-mirror array deflection.

25. The apparatus of claim 22, wherein the switching device provides switching based on polarization and is adapted to provide the polarization via free-space optics.

26. The apparatus of claim 22, wherein the switching device provides switching based on polarization using all-fiber cross-bar switching.

27. The apparatus of claim 22, wherein the switching device provides switching based on interferometry with an in-fiber illumination switch or with a multiple wavelength system.

28. The apparatus of claim 18, wherein the switching device provides switching using binary micro-mirror array deflection.

29. The apparatus of claim 18, wherein the switching device comprises a scanner-based switch operable in cross, bar, and dump states.

* * * * *